(12) United States Patent
Chong et al.

(10) Patent No.: US 12,554,061 B2
(45) Date of Patent: Feb. 17, 2026

(54) MICRO-RING MODULATOR AND METHOD FOR MANUFACTURING MICRO-RING MODULATOR

(71) Applicant: ZTE CORPORATION, Shenzhen (CN)

(72) Inventors: Haining Chong, Shenzhen (CN); Ningfeng Tang, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 436 days.

(21) Appl. No.: 17/999,419

(22) PCT Filed: May 20, 2021

(86) PCT No.: PCT/CN2021/094952
§ 371 (c)(1),
(2) Date: Nov. 21, 2022

(87) PCT Pub. No.: WO2021/233390
PCT Pub. Date: Nov. 25, 2021

(65) Prior Publication Data
US 2023/0236360 A1    Jul. 27, 2023

(30) Foreign Application Priority Data
May 21, 2020  (CN) .................. 202010437506.4

(51) Int. Cl.
*G02B 6/12* (2006.01)
*G02B 6/122* (2006.01)
*H10K 71/00* (2023.01)

(52) U.S. Cl.
CPC ........... *G02B 6/1226* (2013.01); *H10K 71/00* (2023.02); *G02B 2006/12166* (2013.01)

(58) Field of Classification Search
CPC ........ G02B 6/1226; G02B 2006/12166; H10K 71/00
See application file for complete search history.

(56) References Cited

U.S. PATENT DOCUMENTS

| | | | |
|---|---|---|---|
| 7,010,183 B2* | 3/2006 | Estes ................ | B82Y 20/00 385/37 |
| 7,941,015 B2* | 5/2011 | Bratkovski ........ | G02B 6/42 385/32 |

(Continued)

FOREIGN PATENT DOCUMENTS

| CN | 101201435 A | 6/2008 |
|---|---|---|
| CN | 101294806 A | 10/2008 |

(Continued)

OTHER PUBLICATIONS

Swillam et al., On Chip Optical Modulator using Epsilon-Near-Zero Hybrid Plasmonic Platform. Sci Rep 9, 6669 (2019). https://doi.org/10.1038/s41598-019-42675-z (Year: 2019).*

(Continued)

*Primary Examiner* — Peter Radkowski
(74) *Attorney, Agent, or Firm* — HAUPTMAN HAM, LLP

(57) ABSTRACT

Disclosed are a micro-ring modulator and a method for manufacturing a micro-ring modulator. The micro-ring modulator includes at least one straight waveguide and at least one surface plasmon polariton micro-ring resonator coupled to the straight waveguide. The straight waveguide is configured for transmitting an optical signal; and the surface plasmon polariton micro-ring resonator is configured for modulating an intensity of an optical signal with a wavelength corresponding to the surface plasmon polariton micro-ring resonator.

15 Claims, 13 Drawing Sheets

(56) References Cited

U.S. PATENT DOCUMENTS

| | | | |
|---|---|---|---|
| 8,872,503 B2* | 10/2014 | Miyazaki | G02F 1/21 |
| | | | 324/76.12 |
| 8,891,916 B2* | 11/2014 | Zhang | B82Y 20/00 |
| | | | 385/32 |
| 9,297,955 B2* | 3/2016 | Bartoli | G01N 21/7703 |
| 9,540,576 B2* | 1/2017 | Ng | C08F 10/06 |
| 9,547,107 B2* | 1/2017 | Guo | G02B 5/201 |
| 9,595,328 B2* | 3/2017 | Loertscher | G02F 3/00 |
| 9,678,004 B2* | 6/2017 | Bartoli | G01N 21/553 |
| 10,054,722 B2* | 8/2018 | Guha | G02B 5/008 |
| 10,102,906 B2* | 10/2018 | Loertscher | G02F 3/00 |
| 10,461,491 B2* | 10/2019 | Park | H01S 3/091 |
| 10,692,577 B2* | 6/2020 | Loertscher | G02F 3/00 |
| 10,762,962 B2* | 9/2020 | Loertscher | G02F 1/0126 |
| 2002/0092824 A1 | 7/2002 | Sun et al. | |
| 2003/0179974 A1* | 9/2003 | Estes | B82Y 20/00 |
| | | | 385/2 |
| 2006/0072875 A1 | 4/2006 | Bhagavatula et al. | |
| 2010/0111462 A1* | 5/2010 | Bratkovski | H10H 20/813 |
| | | | 385/2 |
| 2011/0274390 A1* | 11/2011 | Zhang | B82Y 20/00 |
| | | | 385/27 |
| 2012/0281957 A1* | 11/2012 | Chamanzar | G02B 6/12007 |
| | | | 977/773 |
| 2014/0268332 A1* | 9/2014 | Guo | G02B 5/008 |
| | | | 359/885 |
| 2016/0017242 A1* | 1/2016 | Ng | C08F 8/20 |
| | | | 544/402 |
| 2016/0170242 A1 | 6/2016 | Whelan-Curtin et al. | |
| 2017/0269267 A1* | 9/2017 | Guha | G02B 5/008 |
| 2018/0081204 A1 | 3/2018 | Ma et al. | |
| 2018/0226765 A1* | 8/2018 | Park | H01S 3/0608 |

FOREIGN PATENT DOCUMENTS

| | | |
|---|---|---|
| CN | 202103312 U | 1/2012 |
| CN | 107908056 A | 4/2018 |
| CN | 108519716 A | 9/2018 |
| EP | 3296806 A1 | 3/2018 |
| JP | 2008516283 A | 5/2008 |
| JP | 2009025576 A | 2/2009 |
| JP | 2009509198 A | 3/2009 |
| JP | 2015041070 A | 3/2015 |
| JP | 2017146364 A | 8/2017 |
| JP | 2018511084 A | 4/2018 |
| KR | 20100031152 A | 3/2010 |
| KR | 20110094875 A | 8/2011 |
| WO | 2000050938 A1 | 8/2000 |
| WO | 2008/102511 A1 | 8/2008 |
| WO | 2017140149 A1 | 8/2017 |
| WO | WO-2017200620 A2 * | 11/2017 ............ H01S 5/021 |
| WO | 2018059061 A1 | 4/2018 |

OTHER PUBLICATIONS

López et al., Vertically coupled microring resonators using one epitaxial growth step and single-side lithography. Opt Express. Feb. 23, 2015;23(4):5317-26. doi: 10.1364/OE.23.005317. PMID: 25836563 (Year: 2015).*

International Search Report and Written Opinion issued in corresponding International Application No. PCT/CN2021/094952, mailed Aug. 9, 2021; 11 pgs.

Notice of Reasons for Refusal issued in Japanese Patent Application No. 2022-571734; mailed Apr. 10, 2024; 8 pgs.

Communicaton of and Supplementary Search Report issued in European Patent Application No. 21809009.0; mailed Apr. 23, 2024; 10 pgs.

Notice of Reasons for Refusal issued in Japanese Patent Application No. 2022-571734; mailed Oct. 18, 2023; 10 pgs.

First Office Action in Corresponding Chinese Application No. 202010437506.4, dated Apr. 30, 2025; 15 pgs.

López et al., "Vertically coupled microring resonators using one epitaxial growth step and single-side lithography", Optical Society of America, dated Feb. 20, 2015; 11 pgs.

Swillam et al., "On Chip Optical Modulator using Epsilon-Near-Zero Hybrid Plasmonic Platform", Scientific Reports, dated Apr. 30, 2019; 10 pgs.

Notice of Grant in Corresponding Chinese Application No. 202010437506.4, dated Nov. 28, 2025; 5 pgs.

* cited by examiner

MICRO-RING MODULATOR AND METHOD FOR MANUFACTURING MICRO-RING MODULATOR

CROSS-REFERENCE TO RELATED APPLICATIONS

This application is the National Stage of International Application No. PCT/CN2021/094952, filed on May 20, 2021, which claims priority to Chinese Patent Application 202010437506.4, filed on May 21, 2020, the entire contents of which are incorporated herein by reference.

TECHNICAL FIELD

The present application relates to the field of communication technology, particularly to a micro-ring modulator and a method for manufacturing a micro-ring modulator.

BACKGROUND

With an increasing maturity of optical interconnection technology among cabinets, boards and modules, people start to gradually research optical interconnection inside the chip. Due to low optical loss of silicon in the near-infrared band, the silicon-on-insulator (SOI) is currently the most important on-chip photonics platform for industry, which is not only compatible with CMOS processes, but also facilitates the fabrication of high refractive index waveguides and a variety of active (mainly lasers, modulators and detectors) and passive (couplers, polarization beam splitters, wavelength division multiplexing demultiplexers, multimode interferometers, etc.) photonic devices.

Modulators, as active core devices for optical interconnection on the chip, are required to achieve a large modulation depth for optical signals under the action of electrical signals in a length of a small device while satisfying the premise of low insertion loss and high modulation bandwidth. However, the size of the existing silicon micro-ring modulator is about 10 micrometers, and cannot be reduced.

Therefore, a modulator with low loss to the optical signal and a small size is urgently needed.

SUMMARY

The present application provides a micro-ring modulator and a method for manufacturing a micro-ring modulator.

The embodiment of the present application provides a micro-ring modulator, including at least one straight waveguide and at least one surface plasmon polariton micro-ring resonator coupled to the straight waveguide;
  the straight waveguide configured for transmitting an optical signal; and
  the surface plasmon polariton micro-ring resonator configured for modulating an intensity of an optical signal with a wavelength corresponding to the surface plasmon polariton micro-ring resonator.

The embodiment of the present application also provides a method for manufacturing a micro-ring modulator, including:
  manufacturing at least one straight waveguide, the straight waveguide being configured for transmitting an optical signal; and
  manufacturing at least one surface plasmon polariton micro-ring resonator coupled to the straight waveguide, the surface plasmon polariton micro-ring resonator being configured for modulating an intensity of an optical signal with a wavelength corresponding to the surface plasmon polariton micro-ring resonato.

BRIEF DESCRIPTION OF THE DRAWINGS

FIGS. 20A-1-20B-4 are a schematic structural view of each step of the method for manufacturing a straight waveguide according to the embodiment of the present application.

FIGS. 21A-1-21B-2 are a schematic structural view of each step of the method for manufacturing the surface plasmon polariton micro-ring resonator according to the embodiment of the present application.

FIGS. 22A-1-22B-3 are a schematic structural view of each step of another method for manufacturing the surface plasmon polariton micro-ring resonator according to the embodiment of the present application.

DETAILED DESCRIPTION OF THE EMBODIMENTS

It should be understood that the specific embodiments described herein are intended to explain the present application only and are not intended to limit the present application.

In the subsequent description, suffixes such as "module", "component" or "unit" are used to denote components only for the purpose of facilitating the description of the present application and have no specific meaning of their own. Thus, "module", "component" or "unit" may be mixed.

As mentioned above in the background, the size of existing silicon micro-ring modulators is about 10 micrometers, and cannot be further reduced. The reason is that existing silicon-based optical modulators are limited by the weak plasma dispersion effect of the silicon material, which makes it difficult to obtain larger modulation depths at a smaller size. The surface plasmon polariton (SPP) photonics reveals the potential of metallic nanostructures in solving the size mismatch between dielectric optical systems bounded by diffraction limits and nanoscale on-chip electronic components. The surface plasmon polariton modulators can achieve large optical modulation amplitudes at a few micrometers in size. However, the modulator generally has a large on-chip loss due to the inherent free carrier absorption in the active layer that generates the surface plasmon polaritons. Therefore, a modulator with low loss to the optical signal and a small size is urgently needed.

To address the above technical problems, embodiments of the present application provide a micro-ring modulator that reduces the size and ensures small modulation loss to the optical signal.

Figure 1:
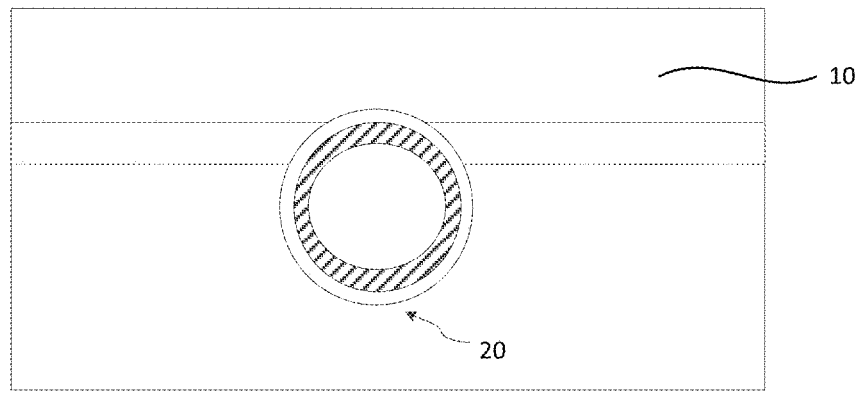
FIG. 1 is a top view of a micro-ring modulator according to an embodiment of the present application.
Figure 2:
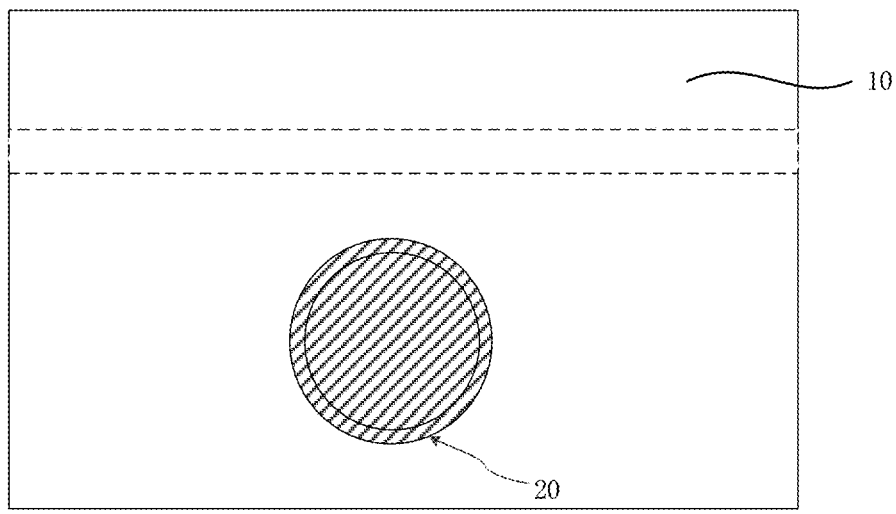
FIG. 2 is a top view of the micro-ring modulator according to another embodiment of the present application.

FIG. 1 is a schematic structural view of a micro-ring modulator according to embodiments of the present application. FIG. 2 is a schematic structural view of another micro-ring modulator according to the embodiments of the present application. As shown in FIGS. 1 and 2, the micro-ring modulator includes: at least one straight waveguide 10 and at least one surface plasmon polariton micro-ring resonator 20 coupled to the straight waveguide; the straight waveguide 10 is configured for transmitting an optical signal; the surface plasmon polariton micro-ring resonator 20 is configured for modulating an intensity of an optical signal with a wavelength corresponding to the surface plasmon polariton micro-ring resonator 20.

It should be noted that FIGS. 1 and 2 are only a schematic structural view of a micro-ring modulator made by coupling a surface plasmon polariton micro-ring resonator 20 to a straight waveguide 10. In FIG. 1, the surface plasmon polariton micro-ring resonator 20 is located at a preset distance above the straight waveguide 10, and the surface plasmon polariton micro-ring resonator 20 and the straight waveguide 10 are vertically coupled to each other. In FIG. 2, the surface plasmon polariton micro-ring resonator 20 and the straight waveguide 10 are located in the same plane and separated by a preset distance, and the surface plasmon polariton micro-ring resonator 20 and the straight waveguide 10 are horizontally coupled to each other.

Figure 3:
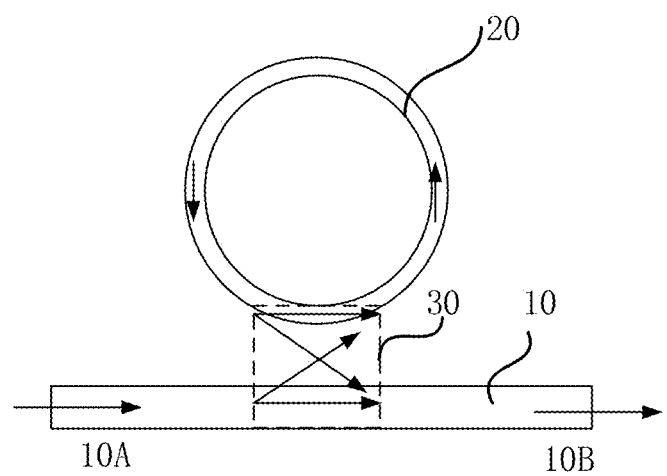
FIG. 3 is a schematic diagram of a transmission and modulation principle of an optical signal by the micro-ring modulator according to the embodiment of the present application.

FIG. 3 is a schematic diagram of a transmission and modulation principle of an optical signal by a micro-ring modulator according to embodiments of the present application. FIG. 3 is a schematic diagram of the transmission and modulation principle of the optical signal of the simplest micro-ring modulator. The micro-ring modulator in FIG. 3 is composed of a surface plasmon polariton micro-ring resonator 20 and a straight waveguide 10 coupled to the surface plasmon polariton micro-ring resonator 20. The number of the surface plasmon polariton micro-ring resonator 20 and the straight waveguide 10 are not limited in the Embodiments of the present application, which can be set by those skilled in the art according to the actual needs. It should be noted that the embodiments of the present application take one straight waveguide 10 and one surface plasmon polariton micro-ring resonator 20 as examples. For example, see FIG. 3, the optical signal with the wavelength corresponding to the surface plasmon polariton micro-ring resonator 20 is transmitted from the input end 10A of the straight waveguide 10, and then are transmitted in the surface plasmon polariton micro-ring resonator 20 for one week when passing the surface plasmon polariton micro-ring resonator 20, and then output from the output end 10B of the straight waveguide 10. As the surface plasmon polariton micro-ring resonator 20 and the straight waveguide 10 are coupled to each other, the coupling can be horizontal or vertical, and the optical signal with the wavelength corresponding to the surface plasmon polariton micro-ring resonator 20 is in the resonance state during the transmission of the surface plasmon polariton micro-ring resonator 20, and the surface plasmon polariton micro-ring resonator 20 can modulate the intensity of the optical signal with the wavelength corresponding to the surface plasmon polariton micro-ring resonator 20. The wavelength of the surface plasmon polariton micro-ring resonator corresponds to the size of the surface plasmon polariton micro-ring resonator 20. The difference between a length of the optical signal transmitted in the surface plasmon polariton micro-ring resonator 20 for one week and a length of the surface plasmon polariton micro-ring resonator 20 in the coupling zone 30 is an integer multiple of a wavelength corresponding to the surface plasmon polariton micro-ring resonator.

In an embodiment, the straight waveguide 10 is a silicon-on-insulator (SOI) silicon photonic straight waveguide, with the waveguide layer made of a silicon material and the cladding layer made of a silicon dioxide material. Due to the large difference in refractive index between silicon and silicon dioxide, the difference is about 2, the optical signal can be transmitted in silicon without entering the silicon dioxide dielectric layer with a very low refractive index. When optical signals are transmitted, due to the low optical loss of silicon in the near-infrared band, the silicon-on-insulator is currently the most important on-chip photonics platform for industry, not only to reduce the loss in the transmission of optical signals, but also to be compatible with CMOS processes to reduce costs to achieve optoelectronic integrated circuits.

The surface plasmon polariton (SPP) photonics reveals the potential of metallic nanostructures in solving the size mismatch between dielectric optical systems bounded by diffraction limits and nanoscale on-chip electronic components. The surface plasmon polariton modulators can achieve large optical modulation amplitudes at a few micrometers in size. The surface plasmon polariton micro-ring resonator 20 typically includes an active layer and a dielectric layer. Under the action of an electrical signal, there are the surface plasmon polaritons at an interface between the active layer and the dielectric layer, and the relative permittivity of these active layers tends to infinitely close to zero, and for the optical signal, the impedance closes to zero, the phase changes infinitely small, and the optical signal can be emitted directionally and limited in a small size. In the embodiment, the size of existing silicon micro-ring modulators is about 10 μm, and the surface plasmon polariton micro-ring resonator 20 reduces the micro-ring size to about 1 μm. Therefore, when the optical signal is in the resonant state, the optical signal can propagate at the interface between the active layer and the dielectric layer, and the propagation medium is the surface plasmon polariton, and the active layer has a better ion dispersion effect, that is, the surface plasmon polariton micro-ring resonator 20 can generate carriers under the action of the electrical signal to change the effective refractive index at the interface between the active layer and the dielectric layer to modulate the intensity of the optical signal. In addition, the surface plasmon polariton micro-ring resonator can act as an optical switch relative to the non-micro-ring surface plasmon polariton micro-ring resonator, to eliminate the loss of the optical signal by the surface plasmon polariton micro-ring resonator when the optical signal is in a non-resonant state.

The technical solution in the embodiment of the present application includes a straight waveguide 10 and a surface plasmon polariton micro-ring resonator 20 coupled to the straight waveguide, the straight waveguide 10 is configured for transmitting the optical signal, and the surface plasmon polariton micro-ring resonator 20 is configured for modulating an intensity of the optical signal with the wavelength corresponding to the surface plasmon polariton micro-ring resonator. Compared to the surface plasmon polariton component, the straight waveguide 10 transmits the optical signal to greatly reduce the transmission loss of the optical signal. Compared to the silicon micro-ring modulator, the surface plasmon polariton micro-ring resonator 20 can limit the optical signal to propagate at a smaller size, to reduce the size of the micro-ring resonator. It should be noted that the technical solution in the embodiment of the present application improves the modulation bandwidth of the micro-ring modulator with slightly reduced losses while reducing the size compared to the silicon-based resonator, so the above technical solution achieves a modulator with low losses to optical signals, a high modulation bandwidth and a small size.

In the above technical solution, compared to the surface plasmon polariton components, the straight waveguide 10 transmits the optical signal, to greatly reduce the loss of the optical signal when passing, and the specific structure of the straight waveguide 10 is described below.

Figure 4:
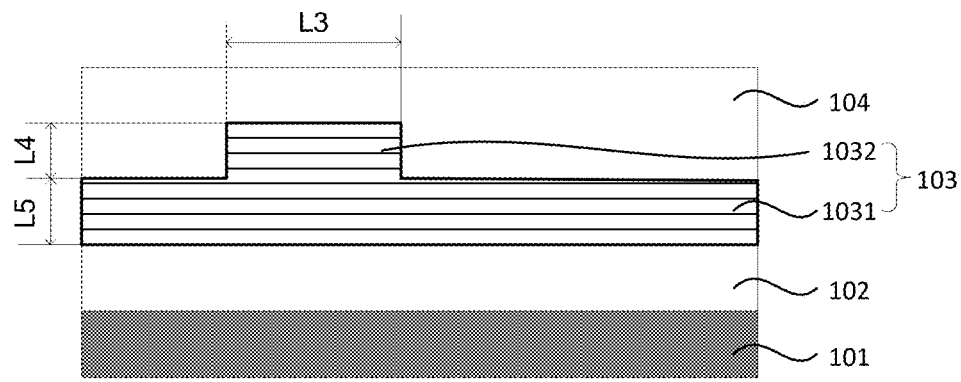
FIG. 4 is a schematic structural view of a straight waveguide according to the embodiment of the present application.

FIG. 4 is a schematic structural view of a straight waveguide according to an embodiment of the present application. Referring to FIG. 4, the straight waveguide includes: a substrate 101, a lower cladding layer 102 located on a surface of the substrate 101, and a first waveguide layer 103 located on a surface of a side of the lower cladding layer 102 away from the substrate 101. The first waveguide layer 103 includes a first plane waveguide 1031 and a ridge waveguide 1032 located on a surface of the first plane waveguide 1031. An upper cladding layer 104 is located on the surface of a side of the first waveguide layer 103 away from the lower cladding layer 102, and the surface of a side of the upper cladding layer 104 away from the first waveguide layer 103 is a plane.

In an embodiment, the substrate 101 can be made of a silicon material. The lower cladding layer 102 can be made of a silicon dioxide material, the first waveguide layer 103 can be made of a silicon material, and the upper cladding layer 104 can be made of a silicon dioxide material. The lower cladding layer 102 and the first waveguide layer 103 constitute the silicon-on-insulator structure, and the first waveguide layer 103 and the upper cladding layer 104 constitute the silicon-on-insulator structure, such structure has significant performance advantages, mainly in the following points: (1) In the wavelength band of optical waves greater than 1.12 micrometers, the intrinsic absorption loss of silicon is extremely small and is nearly transparent and lossless in the communication band of 1550 nm. (2) The material refractive indices of the first waveguide layer 103 and the lower cladding layer 102 or the upper cladding layer 104 differ greatly, about 2. The high refractive index difference makes it possible to limit the optical field. (3) The manufacturing process of the silicon-based photonic device is fully compatible with the mature CMOS process in microelectronics, and the device support is greatly reduced, and optoelectronic integrated circuits are possible.

In the above technical solution, the surface plasmon polariton micro-ring resonator 20 and the straight waveguide 10 are coupled to each other for modulating the intensity of the optical signal with the wavelength corresponding to the surface plasmon polariton micro-ring resonator. The specific structure of the surface plasmon polariton micro-ring resonator 20 when the surface plasmon polariton micro-ring resonator 20 is vertically coupled to the straight waveguide 10, which is illustrated in FIG. 4, is specified below.

Figure 5:
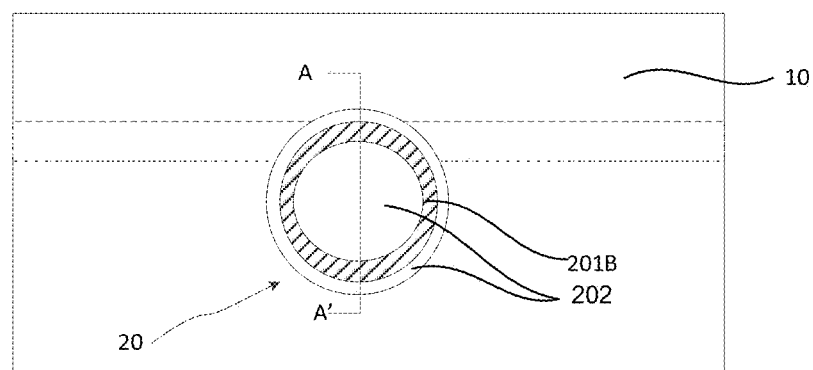
FIG. 5 is a top view of the micro-ring modulator according to the embodiment of the present application.
Figure 6:
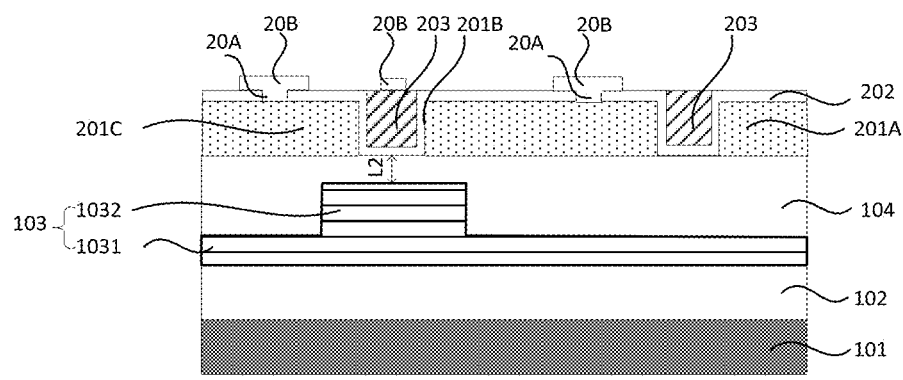
FIG. 6 is a cross-sectional view in the A-A' direction of FIG. 4.

FIG. 5 is a top view of a micro-ring modulator according to an embodiment of the present application. FIG. 6 is a cross-sectional view in the A-A' direction in FIG. 5. As shown in FIGS. 5 and 6, a surface plasmon polariton micro-ring resonator 20 in the micro-ring modulator includes: a conductive micro-ring 201 with a groove, a first dielectric layer 202 and a first surface plasmon polariton active layer 203. The conductive micro-ring 201 with the groove includes a conductive inner ring 201A, an annular groove 201B and a conductive outer ring 201C arranged sequentially from the inside to the outside. The first dielectric layer 202 is located on the surface of the conductive inner ring 201A, a side wall and a bottom of the annular groove 201B, and a surface of the conductive outer ring 201C. The conductive inner ring 201A and the conductive outer ring 201C pass through the conductive through-hole 20A of the first dielectric layer 202 to connect the first electrical signal. The first surface plasmon polariton active layer 203 is located on a surface of a side, away from the annular groove 201B, of the first dielectric layer 202 in the annular groove 201B. The first surface plasmon polariton active layer 203 is configured for connecting the second electrical signal. A contact surface of the first surface plasmon polariton active layer 203 with the first dielectric layer 202 is configured for generating a surface plasmon polariton for modulating the optical signal.

In the embodiment, the conductive micro-ring 201 can be a metal micro-ring, which can made of one or more of gold, silver, and copper. The chemical properties of gold are the most stable, silver has the lowest loss of the surface plasmon polariton, copper is compatible with CMOS processes, and the present application does not limit the choice of its material, and can be selected by the actual requirements.

The first dielectric layer 202 can be made of silicon dioxide, or hafnium dioxide ($HFO_2$). The thickness of the first dielectric layer 202 can be greater than or equal to 5 nm and less than or equal to 15 nm, to ensure sufficient modulation bandwidth of the surface plasmon polariton micro-ring resonator 20, and take into account the modulation efficiency of the surface plasmon polariton micro-ring resonator 20.

The first surface plasmon polariton active layer 203 can generate surface plasmon polaritons under the action of an electrical signal, which can be an epsilonnearzero. The epsilonnearzero (ENZ) refer to a class of metamaterials in which the relative dielectric constant tends infinitely to zero. The relative dielectric constant tends infinitely to zero, for the optical signal, the impedance is close to zero, and the phase changes infinitely small, the optical signal can be emitted directionally and limited to a smaller size. Therefore, when the optical signal is in the resonant state, it can propagate at the interface between the first surface plasmon polariton active layer 203 and the first dielectric layer 202, and the propagation medium is the surface plasmon polariton, and the first surface plasmon polariton active layer 203 has a better ion dispersion effect, that is, under the action of the electrical signal, the first surface plasmon polariton active layer 203 can generate carriers to change the effective refractive index at the interface between the first surface plasmon polariton active layer 203 and the first dielectric layer 202 to modulate the intensity of the optical signal. The commonly used epsilonnearzero can be transparent conductive oxide films (TCO), which have common optoelectronic properties such as forbidden bandwidth, high light transmittance in the visible spectral area and low resistivity. Examples of transparent conductive oxide films can be indium tin oxide (ITO) films, aluminum-doped zinc oxide (AZO) films, cadmium oxide (CdO) films, etc.

In the embodiment, see FIG. 6, the surface plasmon polariton micro-ring resonator 20 also includes a plurality of pads 20B, each conductive through-hole 20A is provided with a pad 20B, the first surface plasmon polariton active layer 203 is provided with a pad 20B. The conductive through-hole 20A and the first surface plasmon polariton active layer 203 obtain the corresponding electrical signal through the pad 20B. It should be noted that the conductive through-hole 20A and the pad 20B are not shown in FIG. 5.

In the embodiment, the first electrical signal connected by the conductive inner ring 201A and the conductive outer ring 201C passing through the conductive through-hole 20A of the first dielectric layer 202 can be a power supply positive signal, and the second electrical signal connected by the first surface plasmon polariton active layer 203 can be a power supply negative signal. The difference between the first electrical signal and the second electrical signal can be controlled to change a concentration of carriers of the first surface plasmon polariton active layer 203, to change the effective refractive index at the interface between the first surface plasmon polariton active layer 203 and the first dielectric layer 202 to modulate the intensity of the optical signal.

In the above technical solution, the surface plasmon polariton micro-ring resonator 20 and the straight waveguide 10 are coupled to each other for modulating the intensity of the optical signal with the wavelength corresponding to the surface plasmon polariton micro-ring resonator 20. The specific structure of the surface plasmon polariton micro-ring resonator 20 when the surface plasmon polariton micro-ring resonator 20 is horizontally coupled to the straight waveguide 10, which is illustrated in FIG. 4, is specified below.

Figure 7:
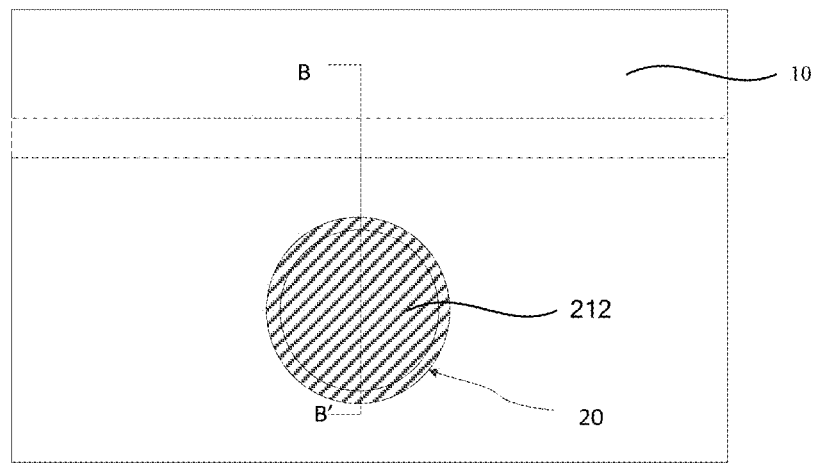
FIG. 7 is a top view of the micro-ring modulator according to yet another embodiment of the present application.
Figure 8:
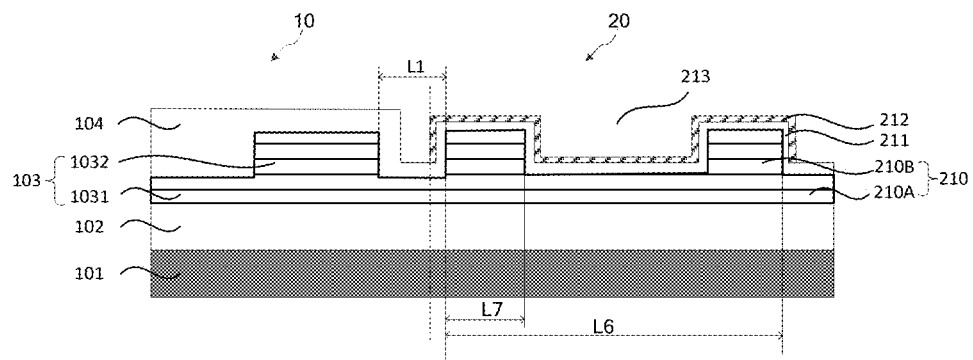
FIG. 8 is a cross-sectional view in the B-B' direction of FIG. 7.

FIG. 7 is a top view of the micro-ring modulator according to yet another embodiment of the present application. FIG. 8 is a cross-sectional view in the B-B' direction in FIG. 7. As shown in FIG. 7 and FIG. 8, a surface plasmon polariton micro-ring resonator 20 in the micro-ring modulator includes: a second waveguide layer 210, a second dielectric layer 211 and a second surface plasmon polariton active layer 212. The second waveguide layer 210 includes a second horizontal waveguide 210A and a micro-ring waveguide 210B located on the surface of the second horizontal waveguide 210A. The micro-ring waveguide 210B is provided with a groove 213, the bottom of the groove 213 exposes a portion of the surface of the second horizontal waveguide 210A. The second dielectric layer 211 is located on the surface 210 of the second waveguide layer, and the second horizontal waveguide 210A located on the periphery of the micro-ring waveguide 210B passes through a conductive through-hole of the second dielectric layer to connect a third electrical signal. The second surface plasmon polariton active layer 212 is located on a surface of a side, away from the surface of the micro-ring waveguide 210B, of the micro-ring waveguide 210B on the second dielectric layer 211, the second surface plasmon polariton active layer 212 is configured to connect the fourth electrical signal, and the contact surface of the second surface plasmon polariton active layer 212 with the second dielectric layer is configured for generating a surface plasmon polariton for modulating the optical signal. It should be noted that the second horizontal waveguide 210A located at the periphery of the micro-ring waveguide 210B passes through the conductive through-hole of the second dielectric layer to connect the third electrical signal, and since the micro-ring waveguide 210B is electrically connected to the second horizontal waveguide 210A, the micro-ring waveguide 210B is connected the third electrical signal.

In the embodiment, the second waveguide layer 210 is made of silicon material and is the same layer as the first waveguide layer 103 in the straight waveguide 10, and the micro-ring waveguide 210B is spaced from the ridge waveguide 1032 at a preset distance L1, which affects the coupling state. The smaller the preset distance L1, the greater the coupling strength between the surface plasmon polariton micro-ring resonator 20 and the straight waveguide 10, the higher the modulation efficiency of the surface plasmon polariton micro-ring resonator 20 to the optical signal; the smaller the preset distance L1, the smaller the coupling strength between the surface plasmon polariton micro-ring resonator 20 and the straight waveguide 10, the lower the modulation efficiency of the surface plasmon polariton micro-ring resonator 20 to the optical signal.

The second dielectric layer 211 can be made of silicon dioxide, or hafnium dioxide ($HFO_2$). The thickness of the second dielectric layer 211 can be greater than or equal to 5 nm, or less than or equal to 15 nm, to ensure sufficient modulation bandwidth of the surface plasmon polariton micro-ring resonator 20, and take into account the modulation efficiency of the surface plasmon polariton micro-ring resonator 20.

The second surface plasmon polariton active layer 212 can generate surface plasmon polariton under the action of an electrical signal, which can be an epsilonnearzero. The epsilonnearzero (ENZ) refer to a class of metamaterials in which the relative dielectric constant tends infinitely to zero. The relative dielectric constant tends infinitely to zero, for the optical signal, the impedance is close to zero, and the phase changes infinitely small, the optical signal can be emitted directionally and limited to a smaller size. Therefore, when the optical signal is in the resonant state, it can propagate at the interface between the second surface plasmon polariton active layer 212 and the second dielectric layer 211, and the propagation medium is the surface plasmon polariton, and the second surface plasmon polariton active layer 212 has a better ion dispersion effect, that is, under the action of the electrical signal, the second surface plasmon polariton active layer 212 can generate carriers to change the effective refractive index at the interface between the second surface plasmon polariton active layer 212 and the second dielectric layer 211 to modulate the intensity of the optical signal. The commonly used epsilonnearzero can be transparent conductive oxide films (TCO), which have common optoelectronic properties such as forbidden bandwidth, high light transmittance in the visible spectral area and low resistivity. Examples of transparent conductive oxide films can be indium tin oxide (ITO) films, aluminum-doped zinc oxide (AZO) films, cadmium oxide (CdO) films, etc.

Figure 9:
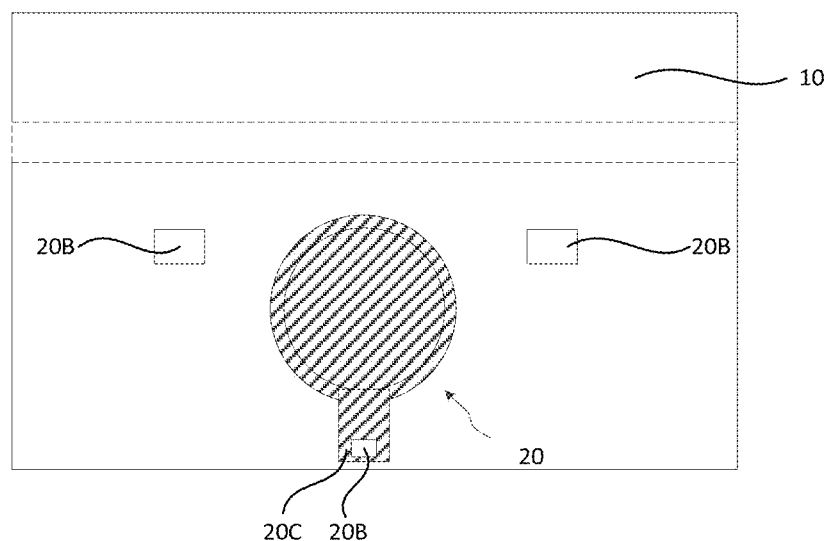
FIG. 9 is a top view of the micro-ring modulator according to yet another embodiment of the present application.

FIG. 9 is a top view of the micro-ring modulator according to yet another embodiment of the present application. As shown in FIG. 9, the surface plasmon polariton micro-ring resonator 20 further includes a plurality of pads 20B, each conductive through-hole is provided with a pad 20B, the conductive through-hole obtains the corresponding electrical signal through a pad 20B. The conductive through-holes passing through the second dielectric layer 211 are symmetrically about the surface plasmon polariton micro-ring resonator 20, so that their corresponding pads 20B are symmetrically about the surface plasmon polariton micro-ring resonator 20. In some embodiments, the surface plasmon polariton micro-ring resonator 20 also includes an active connection layer 20C, which is made of the same material as the second surface plasmon polariton active layer 212 and is partially located on the second surface plasmon polariton active layer 212. The second surface plasmon polariton active layer 212 is connected with the fourth electrical signal through the pad 20B on the active connection layer 20C, to avoid the second surface plasmon polariton active layer 212 on the micro-ring waveguide 210B from directly and electrically connecting with the pad 20B, and avoid damaging the second surface plasmon polariton active layer 212 and affecting the modulation efficiency of the surface plasmon polariton micro-ring resonator 20 to the optical signal. It should be noted that FIG. 7 and FIG. 8 do not show the conductive through-holes and pads, and the conductive through-hole is not shown in FIG. 9. In some embodiments, the pads 20B located at the periphery of the micro-ring waveguide 210B are spaced about 500 nm from the micro-ring waveguide 210B, and the pads 20B on the active connection layer 20C are spaced about 500 nm from the micro-ring waveguide 210B to avoid damaging the micro-ring waveguide 210B during the etching of the metal layer in the process of making the pads 20B, and avoid affecting the modulation efficiency of the surface plasmon polariton micro-ring resonator 20 to the optical signal.

In some embodiments, the third electrical signal can be a power supply positive signal and the fourth electrical signal can be a power supply negative signal. The difference between the third electrical signal and the fourth electrical signal is controlled to change the concentration of carriers in the second surface plasmon polariton active layer 212 to change the effective refractive index at the interface between the second surface plasmon polariton active layer 212 and the second dielectric layer 211, to modulate the intensity of the optical signal.

In order to reduce the contact resistance between the conductive through-hole and the second horizontal waveguide 210A at the periphery of the micro-ring waveguide 210B, the embodiment of the present application provides an N-type doped area or a P-type doped area on the surfaces of the second horizontal waveguide 210A and the micro-ring waveguide 210B adjacent to the second dielectric layer 211.

In the embodiment, the second horizontal waveguide 210A and the micro-ring waveguide 210B are provided with N-type doped areas or P-type doped areas on the surface that is adjacent to the second dielectric layer 211 to reduce the contact resistance between the pads 20B and the second horizontal waveguide 210A at the periphery of the micro-ring waveguide 210B, to further reduce the series resistance of the surface plasmon polariton micro-ring resonator 20. In some embodiments, the value of the contact resistance between the conductive through-hole and the second horizontal waveguide 210A at the periphery of the micro-ring waveguide 210B can be controlled by controlling the concentration of dopant ions. The higher the concentration of the dopant ions, the lower the contact resistance between the pad 20B and the second horizontal waveguide 210A at the periphery of the micro-ring waveguide 210B, and the lower the concentration of the dopant ions, the lower the contact resistance between the pad 20B and the second horizontal waveguide 210A at the periphery of the micro-ring waveguide 210B. The doped concentration is generally 1019-1020 cm$^{-3}$ and the thickness of the doped layer is generally 30-70 nm, in which N-type heavily doped area or a P-type heavily doped area is formed, to further reduce the contact resistance between the pad 20B and the second horizontal waveguide 210A at the periphery of the micro-ring waveguide 210B.

It should be noted that, referring to FIG. 6, the thickness L2 of the portion of the upper cladding layer 104 covering the ridge waveguide 1032 affects the coupling state of the surface plasmon polariton micro-ring resonator 20 to the straight waveguide 10. The thinner the thickness L2 of the portion of the upper cladding layer 104 covering the ridge waveguide 1032, the smaller the coupling strength between the surface plasmon polariton micro-ring resonator 20 and the straight waveguide 10, and the lower the modulation efficiency of the surface plasmon polariton micro-ring resonator 20 to the optical signal; the thicker the thickness of the portion of the upper cladding layer 104 covering the ridge waveguide 1032, the larger the coupling strength between the surface plasmon polariton micro-ring resonator 20 and the straight waveguide 10, the higher the modulation efficiency of the surface plasmon polariton micro-ring resonator 20 to the optical signal.

In the embodiment, referring to FIG. 6, the thickness L2 of the portion of the upper cladding layer 104 covering the ridge waveguide 1032 is greater than or equal to 50 nm and less than or equal to 70 nm.

In the embodiment, the thickness L2 of the portion of the upper cladding layer 104 covering the ridge waveguide 1032 is less than 50 nm, resulting in a weakened mechanical strength of the straight waveguide 10. The thickness L2 of the portion of the upper cladding layer 104 covering the ridge waveguide 1032 is greater than 70 nm, resulting in too little coupling strength of the surface plasmon polariton micro-ring resonator 20 to the straight waveguide 10. Therefore, the thickness L2 of the portion of the upper cladding layer 104 covering the ridge waveguide 1032 is greater than or equal to 50 nm and less than or equal to 70 nm, to avoiding a problem that both the mechanical strength of the straight waveguide 10 are too weak and the coupling strength of the surface plasmon polariton micro-ring resonator 20 to the straight waveguide 10 is too small and the modulation efficiency of the surface plasmon polariton micro-ring resonator 20 to the optical signal is too low.

In the above technical solution, the wavelength corresponding to the surface plasmon polariton micro-ring resonator 20 relates with the size of the surface plasmon polariton micro-ring resonator 20. The difference of a length of the optical signal transmitted in the surface plasmon polariton micro-ring resonator 20 for one week minus a length of the coupling zone 30 is an integer multiple of the wavelength corresponding to the surface plasmon polariton micro-ring resonator.

In the embodiment, referring to FIG. 5, the conductive inner ring 201A has a diameter greater than or equal to 1.8 micrometers and less than or equal to 2.4 micrometers; and/or, the conductive outer ring 201C has a diameter greater than or equal to 2.8 micrometers and less than or equal to 3.2 micrometers; and/or, the annular groove 201B has a width greater than or equal to 80 nm and less than or equal to 100 nm.

The sizes of the conductive inner ring 201A and the conductive outer ring 201C determine the sizes of the annular groove 201B, and the larger the diameter of the conductive inner ring 201A, the longer a circumference of the annular groove 201B; the larger the diameter of the conductive outer ring 201C, the longer a circumference of the annular groove 201B; the wider a width of the annular groove 201B, the wider a width of the first surface plasmon polariton active layer 203 under the first dielectric layer 202 with a certain thickness.

In the embodiment, the diameter of the conductive inner ring 201A is greater than or equal to 1.8 micrometers and less than or equal to 2.4 micrometers; and/or, the diameter of the conductive outer ring 201C is greater than or equal to 2.8 micrometers and less than or equal to 3.2 micrometers, to ensure that the longer circumference of the annular groove 201B satisfies that the wavelength corresponding to the surface plasmon polariton micro-ring resonator is within a preset range. The wavelength corresponding to the surface plasmon polariton micro-ring resonator 20 can be O-band and C-band. The wavelength of the O-band is approximately 1310 nm and the wavelength of the C-band is approximately 1550 nm.

The width of the annular groove 201B is less than 80 nm, resulting in too narrow the width of the first surface plasmon polariton active layer 203 under a certain thickness of the first dielectric layer 202, and too little concentration of carriers provided by the first surface plasmon polariton active layer 203, to make the modulation efficiency of the surface plasmon polariton micro-ring resonator 20 too low. The width of the annular groove 201B is greater than 100 nm, which leads to too wide a width of the first surface plasmon polariton active layer 203 under the first dielectric layer 202 with a certain thickness, resulting in too much absorption of carriers by the first surface plasmon polariton active layer 203, to make the modulation efficiency of the surface plasmon polariton micro-ring resonator 20 too low.

In the embodiment, the straight waveguide 10 in FIG. 4 has a width L3 of the ridge waveguide 1032 greater than or equal to 400 nm and less than or equal to 500 nm. The thickness L4 of the ridge waveguide 1032 is determined by the thickness of the first waveguide layer 103. The thickness L5 of the first plane waveguide 1031 is greater than or equal to 60 nm and less than or equal to 80 nm. The thickness of the first waveguide layer 103 may be 160 nm, 220 nm, or 250 nm. The above size range ensures a small transmission loss for a surface plasmon polariton micro-ring modulator made by coupling a surface plasmon polariton micro-ring resonator 20 to a straight waveguide 10.

The diameter of the micro-ring waveguide 210B determines the length of the optical signal transmitted in the surface plasmon polariton micro-ring resonator 20 for one week, and the wavelength corresponding to the surface plasmon polariton micro-ring resonator. In the embodiment, the micro-ring waveguide 210B has an outer diameter greater than or equal to 10 micrometers and less than or equal to 12 micrometers; and/or, the micro-ring waveguide 210B has a width greater than or equal to 200 nm and less than or equal to 400 nm.

The larger the outer diameter of the micro-ring waveguide 210B, the longer the length of the optical signal transmitted in the surface plasmon polariton micro-ring resonator 20 for one week. The outer diameter L6 of the micro-ring waveguide 210B is greater than or equal to 10 micrometers and less than or equal to 12 micrometers, the wavelength corresponding to the surface plasmon polariton micro-ring resonator is within the preset range, the wavelength corresponding to the surface plasmon polariton micro-ring resonator 20 may be O-band and C-band. The wavelength of the O-band is approximately 1310 nm and the wavelength of the C-band is approximately 1550 nm.

The width L7 of the micro-ring waveguide 210B is less than 200 nm, resulting in too narrow the width of the second surface plasmon polariton active layer 212, and too little concentration of carriers provided by the second surface plasmon polariton active layer 212, to make the modulation efficiency of the surface plasmon polariton micro-ring resonator 20 too low. The width L7 of the micro-ring waveguide 210B is greater than 400 nm, and the width of the second surface plasmon polariton active layer 212 is too wide, resulting in too much absorption of carriers by the first surface plasmon polariton active layer 203, to make the modulation efficiency of the surface plasmon polariton micro-ring resonator 20 too low.

Figure 10:
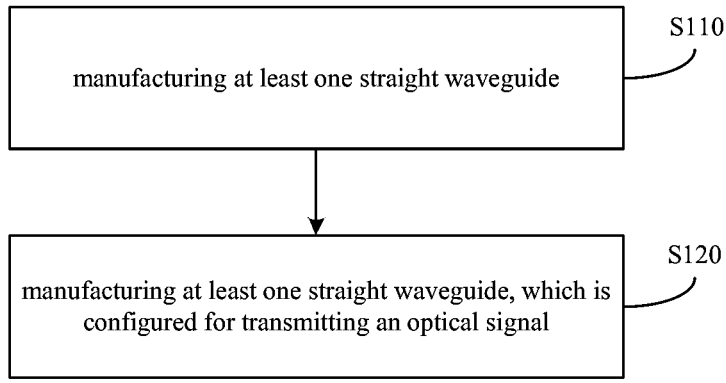
FIG. 10 is a flowchart of a method for manufacturing a micro-ring modulator according to the embodiment of the present application.

Embodiments of the present application also provide a method for manufacturing a micro-ring modulator. FIG. 10 is a flowchart of the method for manufacturing the micro-ring modulator according to embodiments of the present application. FIG. 14-FIG. 19 are schematic structural views of each step of the method for manufacturing the micro-ring modulator according to the embodiment of the present application. FIG. 15 is a left view of FIG. 14. FIG. 17 is a cross-sectional view in the A-A' direction of FIG. 16. FIG. 19 is a cross-sectional view in the B-B' direction in FIG. 18. As shown in FIG. 10, the method for manufacturing the micro-ring modulator includes:

Step 110, manufacturing at least one straight waveguide, which is configured for transmitting an optical signal.

Figure 14:
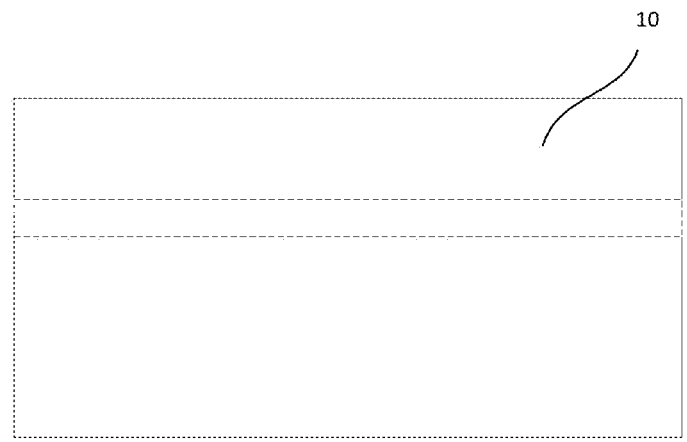
FIG. 14-FIG. 19 is a schematic structural view of each step of the method for manufacturing the micro-ring modulator according to the embodiment of the present application.
Figure 15:
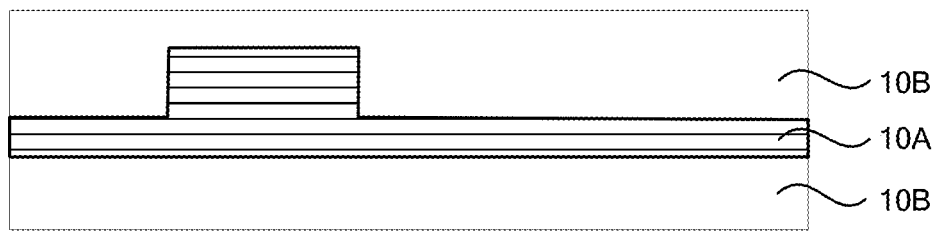

Referring to FIG. 14 and FIG. 15, at least one straight waveguide 10 is manufactured, and the straight waveguide 10 is used to transmit an optical signal. FIG. 14 and FIG. 15 have only one straight waveguide 10. The number of surface plasmon polariton micro-ring resonators and straight waveguides is not limited in embodiments of the present application, and can be set by those skilled in the art according to practical needs. It should be noted that all embodiments of the present application are illustrated with one straight waveguide 10 and one surface plasmon polariton micro-ring resonator 20.

In the embodiment, the straight waveguide 10 is a silicon-on-insulator silicon photonic straight waveguide, with the waveguide layer made of a silicon material and the cladding layer made of a silicon dioxide material. Due to the large difference in refractive index between silicon and silicon dioxide, the difference is about 2, the optical signal can be transmitted in silicon without entering the silicon dioxide dielectric layer with a very low refractive index. When optical signals are transmitted, due to the low optical loss of silicon in the near-infrared band, the silicon-on-insulator is currently the most important on-chip photonics platform for industry, not only to reduce the loss in the transmission of optical signals, but also to be compatible with CMOS processes to reduce costs to achieve opto-electronic integrated circuits.

Step 120, manufacturing at least one surface plasmon polariton micro-ring resonator coupled to the straight waveguide, the surface plasmon polariton micro-ring resonator being configured for modulating an intensity of an optical signal with a wavelength corresponding to the surface plasmon polariton micro-ring resonator.

Figure 16:
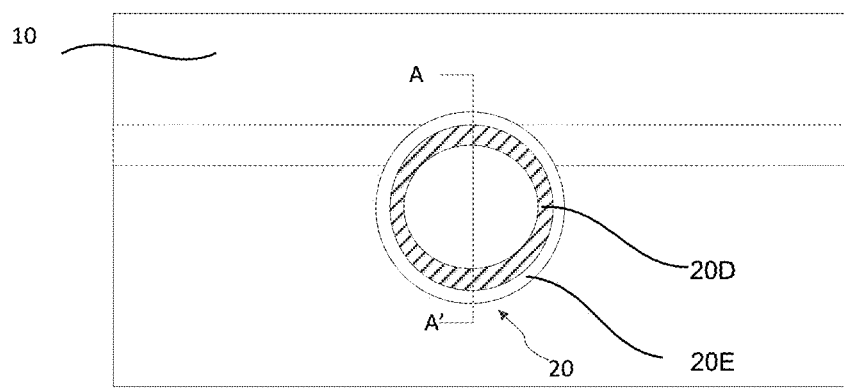
Figure 17:
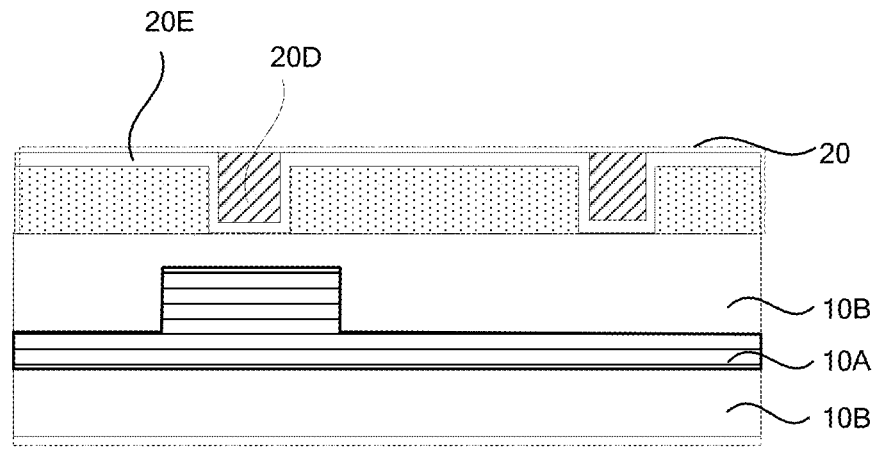
Figure 18:
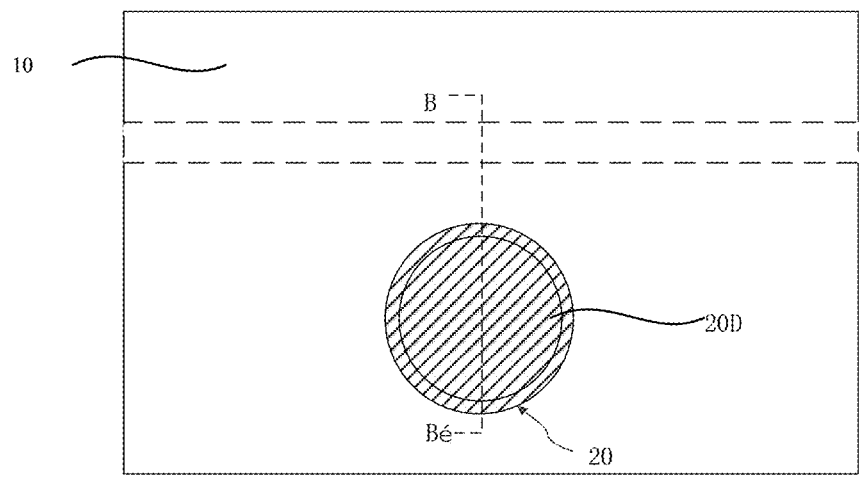
Figure 19:
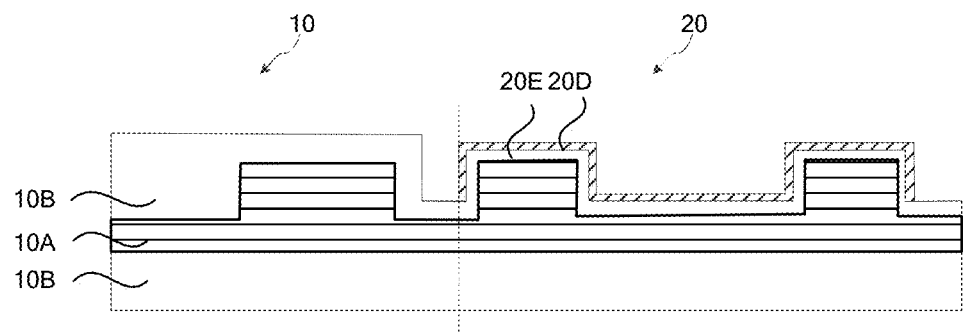

Referring to FIG. 16 and FIG. 17, at least one surface plasmon polariton micro-ring resonator 20 is manufactured to be vertically coupled to the straight waveguide 10, and referring to FIG. 18 and FIG. 19, at least one surface plasmon polariton micro-ring resonator 20 is manufactured to be horizontally coupled to the straight waveguide 10, and shown in FIG. 16 and FIG. 17, the surface plasmon polariton micro-ring resonator 20 is located at a preset distance above the straight waveguide 10, the surface plasmon polariton micro-ring resonator 20 is vertically coupled to the straight waveguide 10. In FIG. 18 and FIG. 19, the surface plasmon polariton micro-ring resonator 20 and the straight waveguide 10 are located in the same plane and separated by a preset distance, and the surface plasmon polariton micro-ring resonator 20 and the straight waveguide 10 are horizontally coupled to each other.

In the embodiment, the surface plasmon polariton micro-ring resonator 20 usually includes an active layer 20D and a dielectric layer 20E, and there are surface plasmon polaritons at the interface between the active layer 20D and the dielectric layer 20E. The relative permittivity of the active layer 20D tends to be infinitely close to zero, and for the optical signal, the impedance is close to zero and the phase changes infinitely small, the optical signal can be directionally emitted and limited to a smaller size. Therefore, when the optical signal is in the resonant state, the optical signal can propagate at the interface between the active layer 20D and the dielectric layer 20E, and the propagation medium is the surface plasmon polariton, and the active layer 20D has a better ion dispersion effect, that is, the surface plasmon polariton micro-ring resonator can generate carriers under the action of the electrical signal to change the effective refractive index at the interface between the active layer 20D and the dielectric layer 20E, to modulate the intensity of the optical signal.

The technical solution in the embodiment of the present application includes a straight waveguide 10 and a surface plasmon polariton micro-ring resonator 20 coupled to the straight waveguide, the straight waveguide 10 is configured for transmitting the optical signal, and the surface plasmon polariton micro-ring resonator 20 is configured for modulating the intensity of the optical signal with the wavelength corresponding to the surface plasmon polariton micro-ring resonator. Compared to the surface plasmon polariton component, the straight waveguide 10 transmits the optical signal, to greatly reduce the transmission loss of the optical signal. Compared to the silicon micro-ring modulator, the surface plasmon polariton micro-ring resonator 20 can limit the optical signal to propagate at a smaller size, to reduce the size of the micro-ring resonator. It should be noted that the technical solution in the embodiment of the present application improves the modulation bandwidth of the micro-ring modulator with slightly reduced losses while reducing the size compared to the silicon-based resonator, so the above technical solution achieves a modulator with low losses to optical signals, a high modulation bandwidth and a small size.

In the above technical solution, compared to the surface plasmon polariton components, the straight waveguide 10 transmits the optical signal, to greatly reduce the loss of the optical signal when passing, and the method for manufacturing the straight waveguide 10 is described in detail below.

Figure 11:
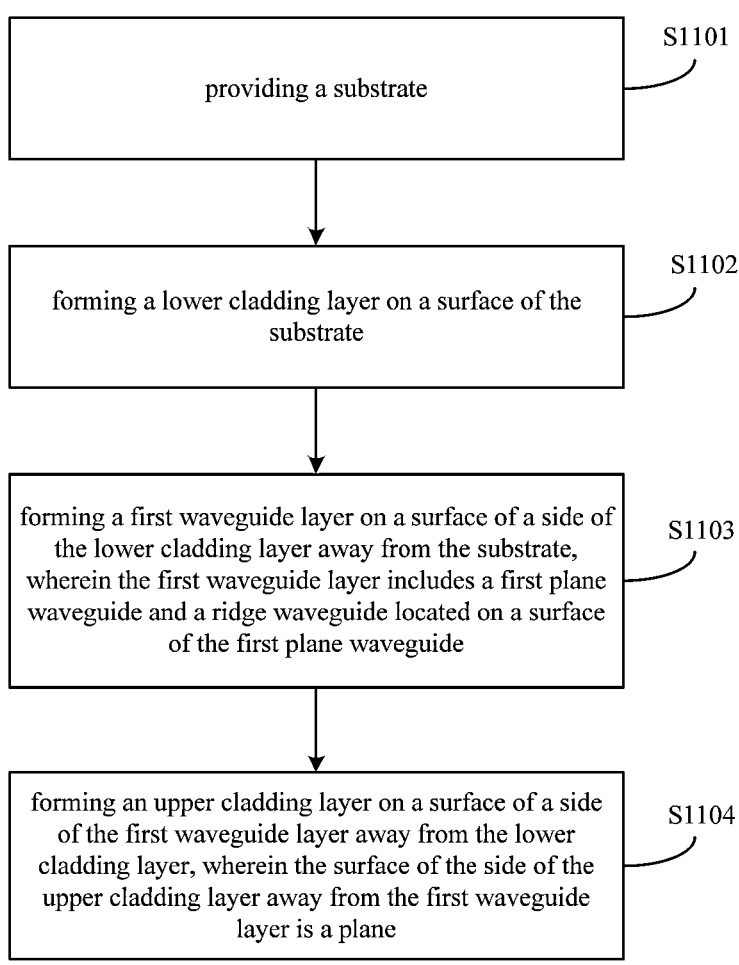
FIG. 11 is a flowchart of a method for manufacturing a straight waveguide according to the embodiment of the present application.

FIG. 11 is a flowchart of the method for manufacturing a straight waveguide according to embodiments of the present application. FIG. 2 is a schematic structural view of each step of the method for manufacturing a straight waveguide according to embodiments of the present application. In FIG. 20, FIG. 20B-1 is the left view of FIG. 20A-1. FIG. 20B-2 is the left view of FIG. 20A-2. FIG. 20B-3 is the left view of FIG. 20A-3. FIG. 20B-4 is the left view of FIG. 20A-4. Referring to FIG. 11, the method for manufacturing the straight waveguide includes:

Step 1101, providing a substrate.

Figures 1, 20A:
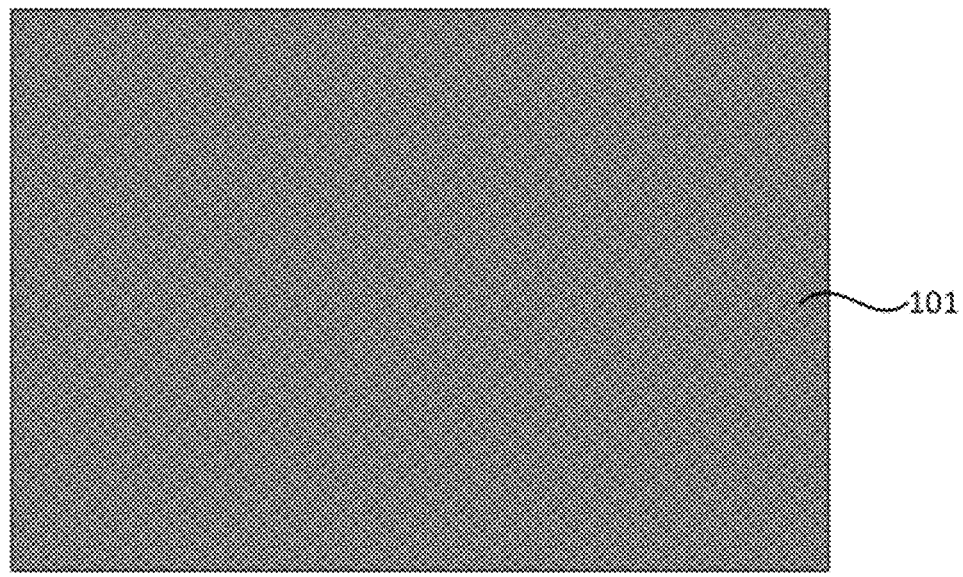
Figures 2, 20A:
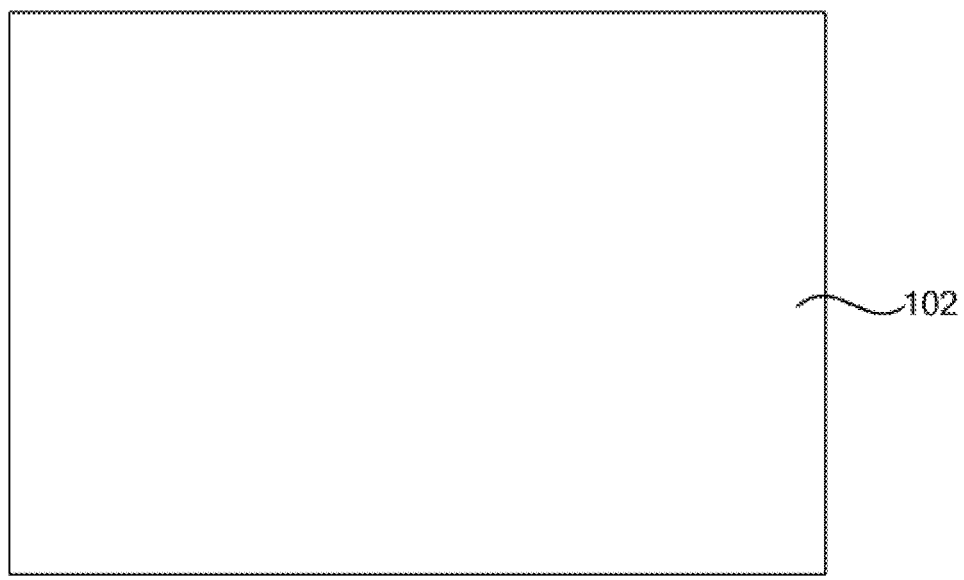
Figures 3, 20A:
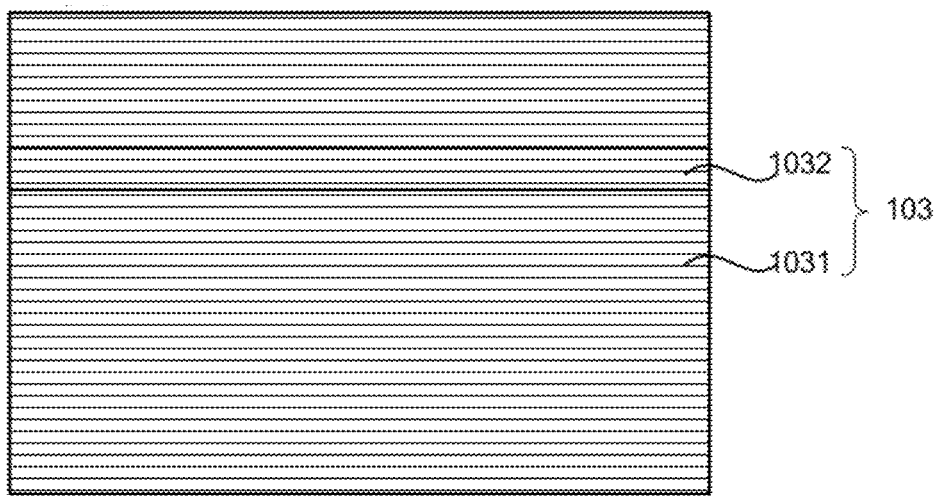
Figures 4, 20A:
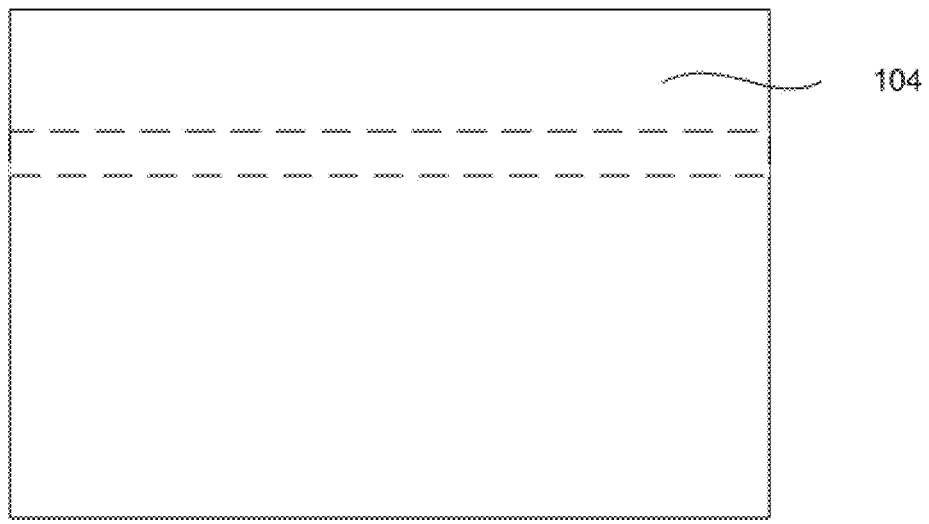
Figures 1, 20B:
Figures 2, 20B:
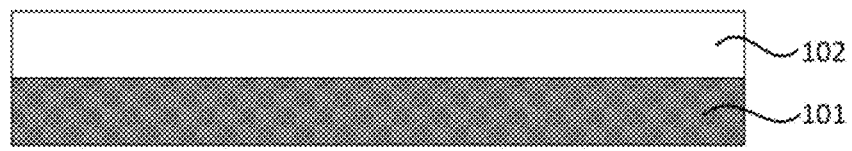
Figures 3, 20B:
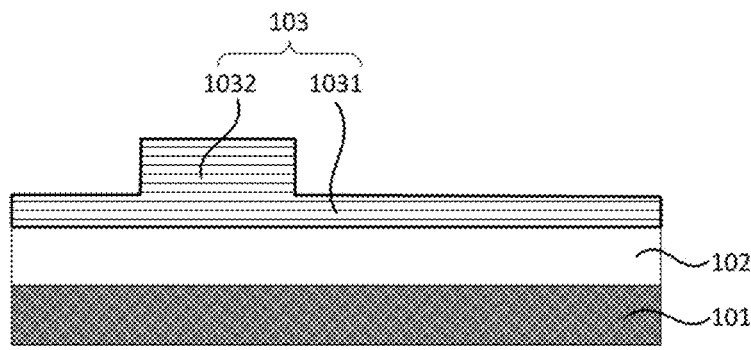
Figures 4, 20B:
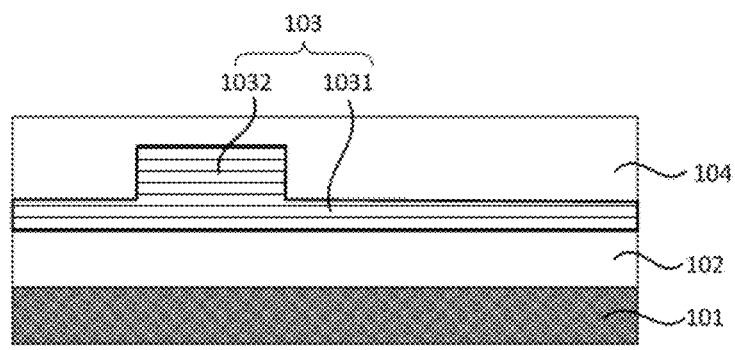

Referring to FIG. 20A-1 and FIG. 20B-1 in FIG. 20, a substrate 101 is provided, the substrate 101 can be made of a silicon material.

Step 1102: forming a lower cladding layer on a surface of the substrate.

Referring to FIGS. 20A-2 and FIG. 20B-2 in FIG. 20, the lower cladding layer 102 is formed on the surface of the substrate 101. The lower cladding layer 102 can be made of a silicon dioxide material formed by a thermal oxidation process.

Step 1103, forming a first waveguide layer on a surface of a side of the lower cladding layer away from the substrate, wherein the first waveguide layer includes a first plane waveguide and a ridge waveguide located on a surface of the first plane waveguide.

Referring to FIGS. 20A-3 and FIG. 20B-3 in FIG. 20, a first waveguide layer 103 is formed on the surface of the side of the lower cladding layer 102 away from the substrate 101, the first waveguide layer 103 includes a first plane waveguide 1031 and a ridge waveguide 1032 located on a surface of the first plane waveguide. The lower cladding layer 102 and the first waveguide layer 103 form an insulator-on-silicon structure.

The first waveguide layer 103 includes a first plane waveguide 1031 and a ridge waveguide 1032 located on the surface of the first plane waveguide. The formation process of the first waveguide layer 103 includes: forming a silicon material layer on the surface of the lower cladding layer 102 away from the substrate 101, forming a first waveguide layer 103 by an etching process on the surface of the silicon material layer away from the lower cladding layer 102. The first waveguide layer 103 includes a first plane waveguide 1031 and a ridge waveguide 1032 located on the surface of the first plane waveguide, the etching process may include electron beam lithography (EBL) and reactive ion etching (RIE) processes. The electron beam lithography starts with a negative photoresist to form a photolithography mask, the photoresist is spin-coated at about 3000 rpm and the pre-bake temperature is about 95° C. In the negative photoresist exposure and development process, the base dose exposure is about 1100 µC/cm², and the development solution is about 25% tetramethylammonium hydroxide (TMAH) solution, and then the photolithography mask is immersed in deionized water and isopropyl alcohol for cleaning. The etching gas used for the reactive ion etching process is $C_4F_8$ and $SF_6$ in a ratio of about 8:8. In order to obtain a balance between the etching and passivation gas process, an etching rate of about 3.2 nm/s is used.

Step 1104: forming an upper cladding layer on a surface of a side of the first waveguide layer away from the lower cladding layer, wherein the surface of the side of the upper cladding layer away from the first waveguide layer is a plane.

Referring to FIG. 20A-4 and FIG. 20B-4 in FIG. 20, an upper cladding layer 104 is formed on the surface of the side of the first waveguide layer 103 away from the lower cladding layer 102, and the surface of the side of the upper cladding layer 104 away from the first waveguide layer 103 is a plane. The upper cladding layer 104 can be made of a silica material. The first waveguide layer 103 and the upper cladding layer 104 form an insulator-on-silicon structure.

The manufacturing process of the upper cladding layer 104 in the embodiment includes: forming a silicon dioxide material layer on the surface of the side of the first waveguide layer 103 away from the lower cladding layer 102 by a thermal annealing process, and then flattening the silicon dioxide material layer by an etching process, forming an upper cladding layer 104 with a plane on a side away from the first waveguide layer 103.

In the above technical solution, the surface plasmon polariton micro-ring resonator 20 is coupled to the straight waveguide 10 for modulating the intensity of the optical signal with the wavelength corresponding to the surface plasmon polariton micro-ring resonator. The following specifies the method for manufacturing the surface plasmon polariton micro-ring resonator 20 when the surface plasmon polariton micro-ring resonator 20 is vertically coupled to the straight waveguide 10.

Figure 12:
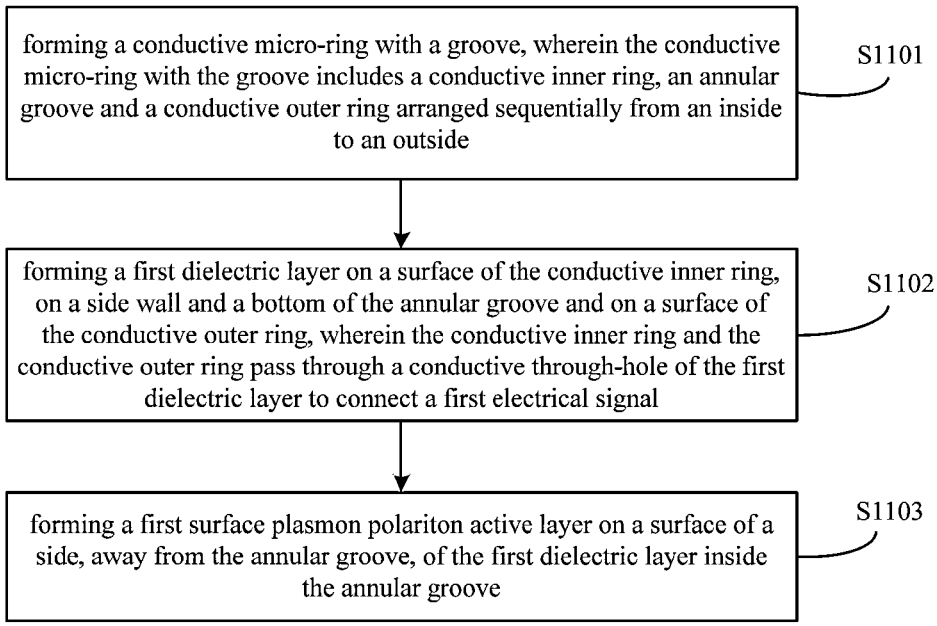
FIG. 12 is a flowchart of a method for manufacturing the surface plasmon polariton micro-ring resonator according to the embodiment of the present application.

FIG. 12 is a flowchart of a method for manufacturing a surface plasmon polariton micro-ring resonator according to an embodiment of the present application. FIG. 21 is a schematic structural view of each step of a method for manufacturing a surface plasmon polariton micro-ring resonator according to embodiments of the present application. FIG. 21B-1 in FIG. 21 is a cross-sectional view of FIG. 21A-1. FIG. 21B-2 is a cross-sectional view in the A-A' direction of FIG. 21A-2. Referring to FIG. 12, the method for manufacturing a surface plasmon polariton micro-ring resonator vertically coupled a straight waveguide includes:

Step 1201, forming a conductive micro-ring with a groove, wherein the conductive micro-ring with the groove includes a conductive inner ring, an annular groove and a conductive outer ring arranged sequentially from an inside to an outside.

Figures 1, 21A:
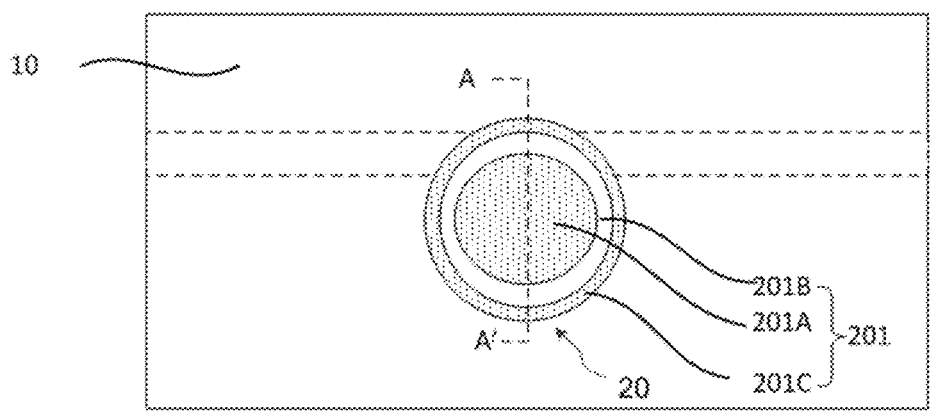
Figures 2, 21A:
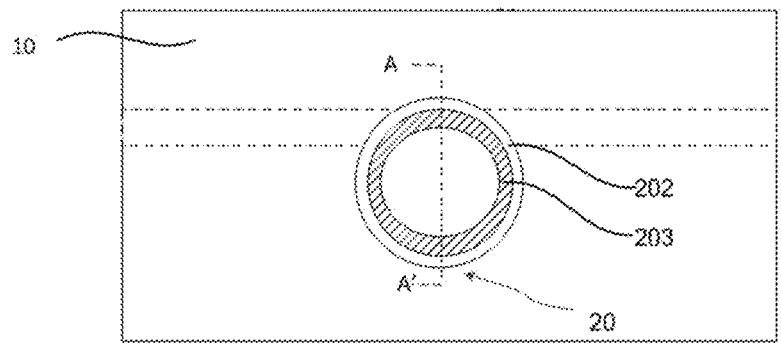
Figures 1, 21B:
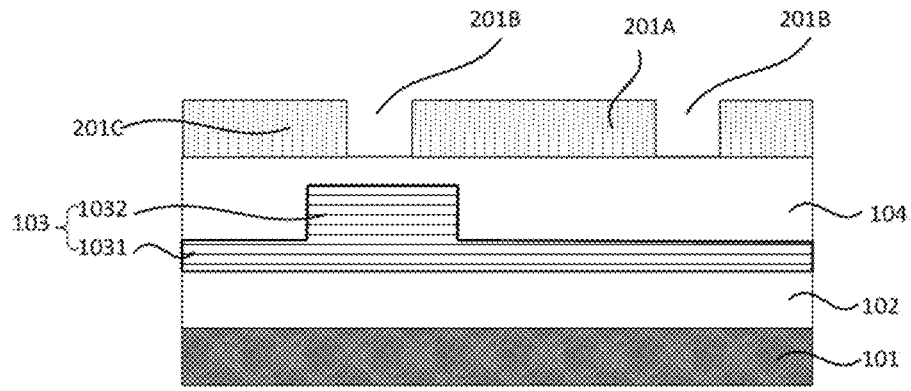
Figures 2, 21B:
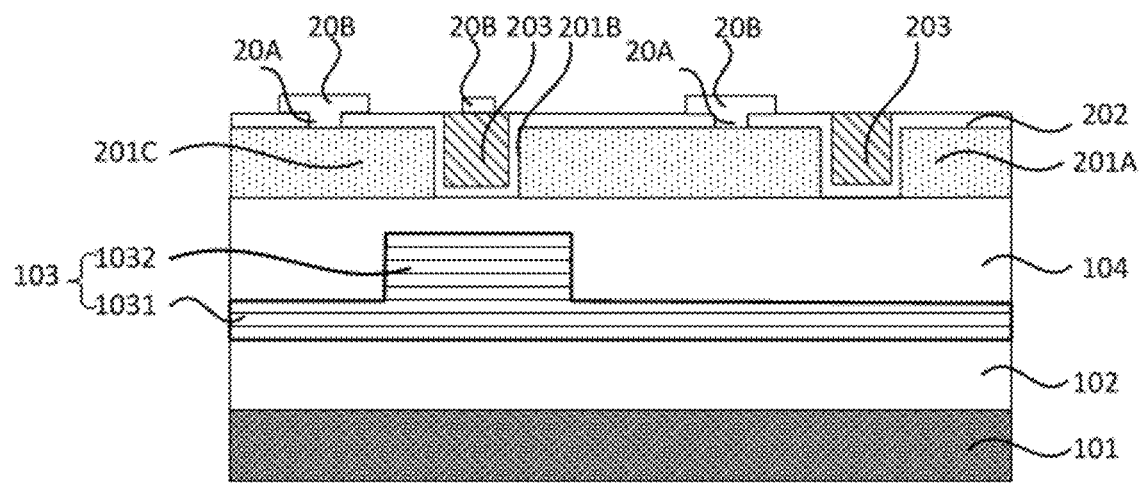

Referring to FIGS. 21A-1 and 21B-1 in FIG. 21, a conductive micro-ring 201 with a groove is formed on the surface of the upper cladding layer 104 away from the first waveguide layer 103, the conductive micro-ring 201 with the groove includes a conductive inner ring 201A, an annular groove 201B, and a conductive outer ring 201C arranged sequentially from the inside to the outside. In the embodiment, the conductive micro-ring 201 may be a metal micro-ring, the metal can be one or more of gold, silver, and copper. Gold has the most stable chemical properties, silver has the lowest loss of surface plasmon polaritons, and copper is compatible with CMOS processes. The materials are not limited in the present application, and can be selected according to the actual requirements. The thickness L2 of the portion of the upper cladding layer 104 covering the ridge waveguide 1032 affects the coupling state of the surface plasmon polariton micro-ring resonator 20 to the straight waveguide 10. The thinner the thickness L2 of the portion of the upper cladding layer 104 covering the ridge waveguide 1032, the smaller the coupling strength between the surface plasmon polariton micro-ring resonator 20 and the straight waveguide 10, and the lower the modulation efficiency of the surface plasmon polariton micro-ring resonator 20 to the optical signal; the thicker the thickness of the portion of the upper cladding layer 104 covering the ridge waveguide 1032, the larger the coupling strength between the surface plasmon polariton micro-ring resonator 20 and the straight waveguide 10, the higher the modulation efficiency of the surface plasmon polariton micro-ring resonator 20 to the optical signal.

Step 1202, forming a first dielectric layer on a surface of the conductive inner ring, on a side wall and a bottom of the annular groove and on a surface of the conductive outer ring, wherein the conductive inner ring and the conductive outer ring pass through a conductive through-hole of the first dielectric layer to connect a first electrical signal.

Referring to FIGS. 21A-2 and 21B-2 in FIG. 21, a first dielectric layer 202 is formed on the surface of the conductive inner ring 201A, the side wall and the bottom of the annular groove 201B, and the surface of the conductive outer ring 201C, and the conductive inner ring 201A and the conductive outer ring 201C are connected with the first electrical signal through the conductive through-hole 20A of the first dielectric layer 202. The first dielectric layer 202 can be made of silicon dioxide, hafnium dioxide (HFO$_2$). The thickness of the first dielectric layer 202 may be greater than or equal to 5 nm and less than or equal to 15 nm, to ensure sufficient modulation bandwidth of the surface plasmon polariton micro-ring resonator 20, and to take into account the modulation efficiency of the surface plasmon polariton micro-ring resonator 20.

Step 1203, forming a first surface plasmon polariton active layer on a surface of a side, away from the annular groove, of the first dielectric layer inside the annular groove, wherein the first surface plasmon polariton active layer is configured for connecting a second electrical signal, a contact surface of the first surface plasmon polariton active layer with the first dielectric layer is configured for generating a surface plasmon polariton for modulating the optical signal.

Continuing to refer to FIGS. 20A-2 and 20B-2 in FIG. 20, the first surface plasmon polariton active layer 203 is formed on the surface of a side, away from the annular groove 201B, of the first dielectric layer 202 inside the annular groove 201B, the first surface plasmon polariton active layer 203 is used to connect the second electrical signal, the contact surface of the first surface plasmon polariton active layer 203 with the first dielectric layer 202 is used to generate the surface plasmon polariton for modulating the optical signal.

The first surface plasmon polariton active layer 203 can generate the surface plasmon polariton under the action of an electrical signal, which can be an epsilonnearzero. When the optical signal is in the resonant state, it can propagate at the interface between the first surface plasmon polariton active layer 203 and the first dielectric layer 202, and the propagation medium is the surface plasmon polariton, and the first surface plasmon polariton active layer 203 has a better ion dispersion effect, that is, under the action of the electrical signal, the first surface plasmon polariton active layer 203 can generate carriers to change the effective refractive index at the interface between the first surface plasmon polariton active layer 203 and the first dielectric layer 202 to modulate the intensity of the optical signal. The commonly used epsilonnearzero can be transparent conductive oxide films (TCO), which have common optoelectronic properties such as forbidden bandwidth, high light transmittance in the visible spectral area and low resistivity. Examples of transparent conductive oxide films can be indium tin oxide (ITO) films, aluminum-doped zinc oxide (AZO) films, cadmium oxide (CdO) films, etc.

In the embodiment, see FIG. 21, a plurality of pads 20B can also be formed in the surface plasmon polariton micro-ring resonator 20, each conductive through-hole 20A is provided with a pad 20B, and the pad 20B is formed on the first surface plasmon polariton active layer 203, the conductive through-hole 20A and the first surface plasmon polariton active layer 203 obtain the corresponding electrical signal through the pad 20B. FIG. 21A-2 in FIG. 21 does not show the pad 20B and conductive through-hole 20A.

In the embodiment, the first electrical signal connected by the conductive inner ring 201A and the conductive outer ring 201C passing through the conductive through-hole 20A of the first dielectric layer 202 can be a power supply positive signal, and the second electrical signal connected to the first surface plasmon polariton active layer 203 can be a power supply negative signal. The difference between the first electrical signal and the second electrical signal can be controlled to change the concentration of the carrier of the first surface plasmon polariton active layer 203, to change the effective refractive index at the interface between the first surface plasmon polariton active layer 203 and the first dielectric layer 202 to modulate the intensity of the optical signal.

In the above technical solution, the surface plasmon polariton micro-ring resonator 20 and the straight waveguide 10 are coupled to each other for modulating the intensity of the optical signal with the wavelength corresponding to the surface plasmon polariton micro-ring resonator 20. The following specifies the method for manufacturing the surface plasmon polariton micro-ring resonator 20 when the surface plasmon polariton micro-ring resonator 20 and the straight waveguide 10 are horizontally coupled to each other.

Figure 13:
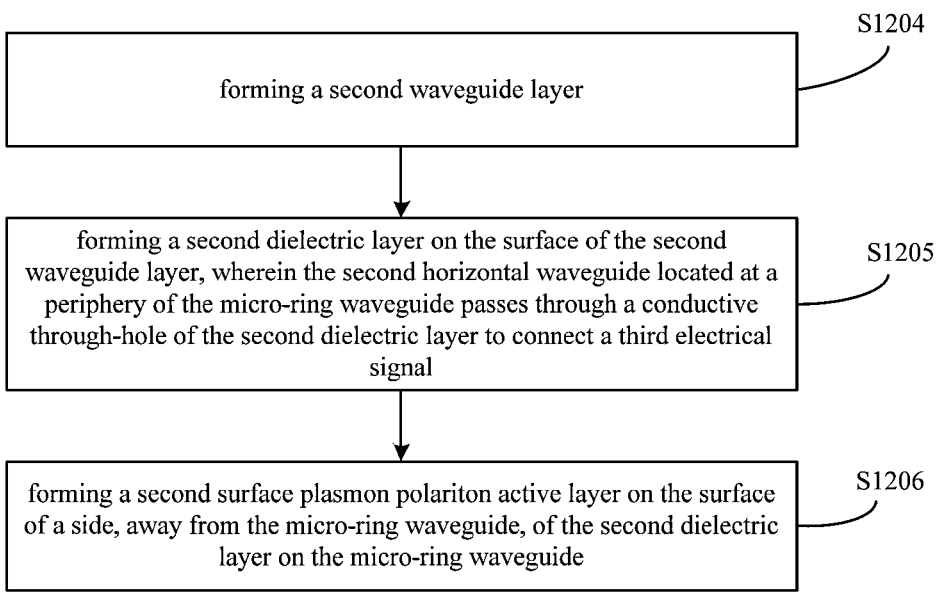
FIG. 13 is a flowchart of the method for manufacturing the surface plasmon polariton micro-ring resonator according to another embodiment of the present application.
Figures 1, 22A:
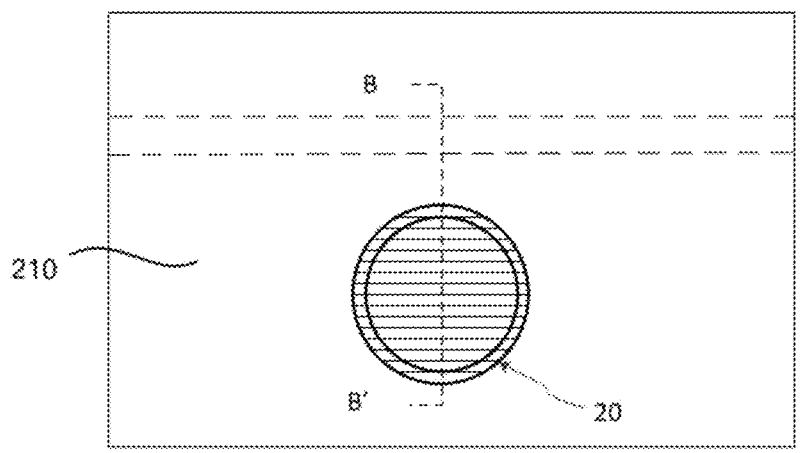
Figures 2, 22A:
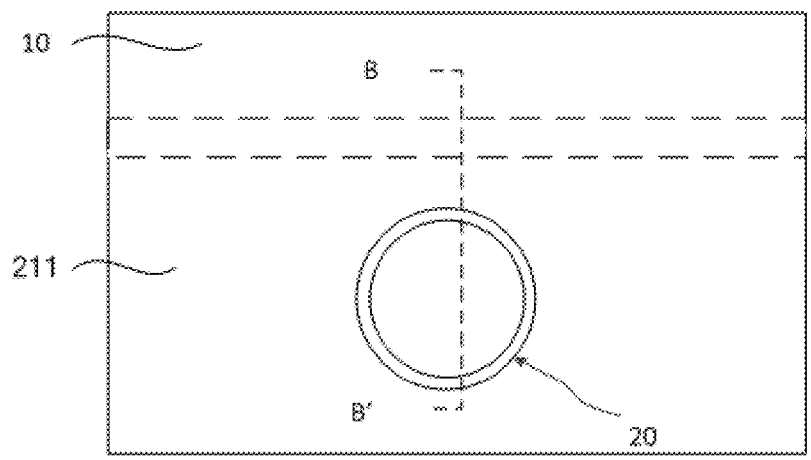
Figures 3, 22A:
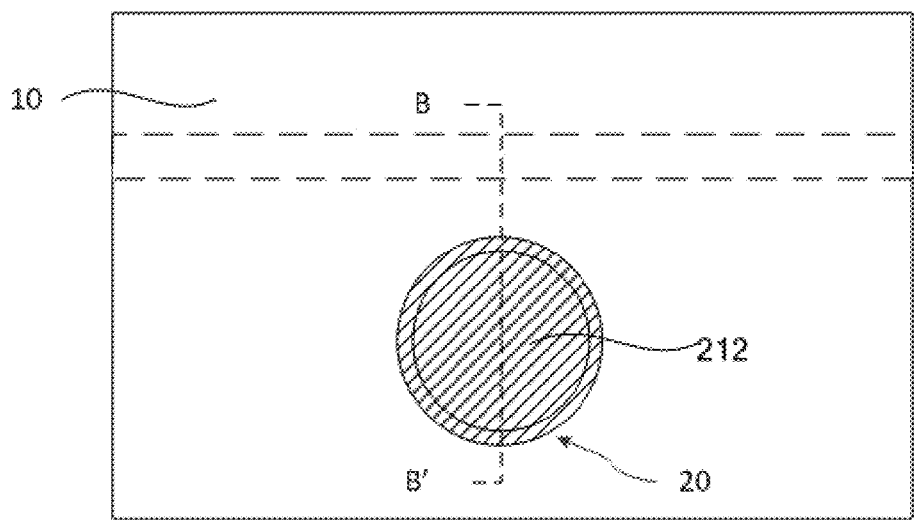
Figures 1, 22B:
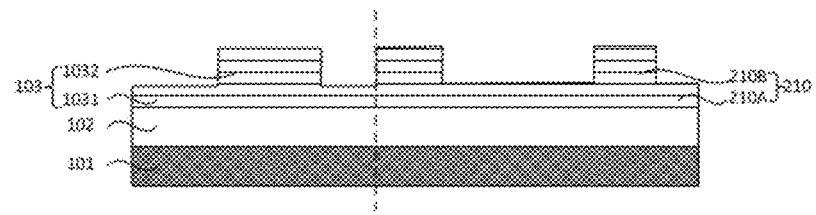
Figures 2, 22B:
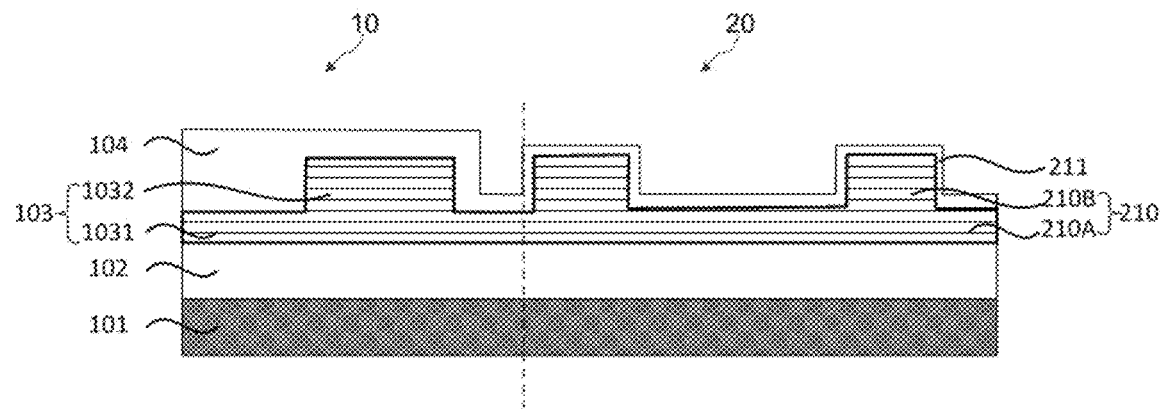
Figures 3, 22B:
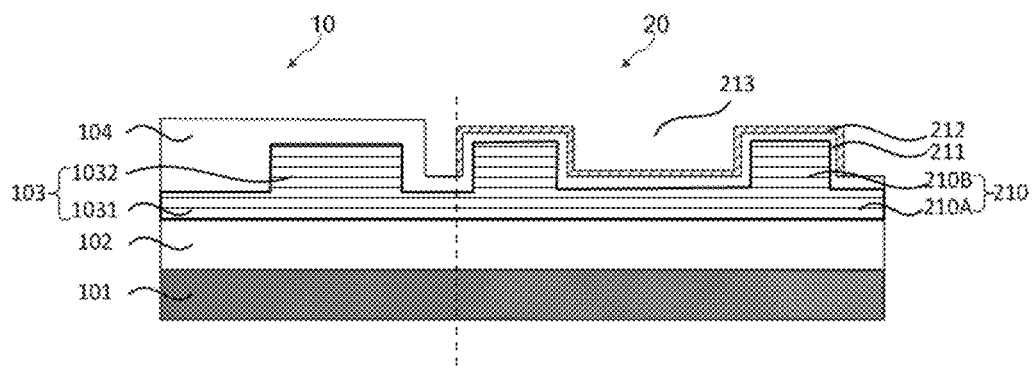

FIG. 13 is a flowchart of the method for manufacturing surface plasmon polariton micro-ring resonators according to another embodiment of the present application. FIG. 22 is a schematic structural view of each step of the method for manufacturing another surface plasmon polariton micro-ring resonator according to embodiments of the present application. FIG. 22B-1 in FIG. 22 is a cross-sectional view in the B-B' direction in FIG. 22A-1. FIG. 22B-2 is a cross-sectional view of the B-B' direction in FIG. 22A-2. FIG. 22A-3 is the section of B-B' direction in FIG. 22A-3.

Referring to FIG. 13, the method for manufacturing a surface plasmon polariton micro-ring resonator horizontally coupled to a straight waveguide includes:

Step 1204, forming a second waveguide layer, wherein the second waveguide layer comprises a second horizontal waveguide and a micro-ring waveguide located on a surface of the second horizontal waveguide, wherein the micro-ring waveguide is provided with a groove, a bottom of the groove exposes a portion of the surface of the second horizontal waveguide.

Referring to FIG. 22A-1 and FIG. 22B-1 in FIG. 22, a second waveguide layer 210 is formed, the second waveguide layer 210 includes a second horizontal waveguide 210A and a micro-ring waveguide 210B located on the surface of the second horizontal waveguide 210A, the micro-ring waveguide 210B is provided with a groove 213, the bottom of the groove 213 exposes a portion of the surface of the second horizontal waveguide 210A. It should be noted that the second waveguide layer 210 and the first waveguide layer 103 are made in the same layer by using the same process method, and the surface plasmon polariton micro-ring resonator horizontally coupled to the straight waveguide is manufactured by setting the micro-ring waveguide 210B and the ridge waveguide 1032 spaced from each other at a preset distance L1. The second waveguide layer 210 is made of silicon material and is the same layer as the first waveguide layer 103 in the straight waveguide 10, and the micro-ring waveguide 210B is spaced from the ridge waveguide 1032 at a preset distance L1, which affects the coupling state. The smaller the preset distance L1, the greater the coupling strength between the surface plasmon polariton micro-ring resonator 20 and the straight waveguide 10, the higher the modulation efficiency of the surface plasmon polariton micro-ring resonator 20 to the optical signal; the larger the preset distance L1, the smaller the coupling strength between the surface plasmon polariton micro-ring resonator 20 and the straight waveguide 10, the lower the modulation efficiency of the surface plasmon polariton micro-ring resonator 20 to the optical signal.

Step 1205, forming a second dielectric layer on the surface of the second waveguide layer, wherein the second horizontal waveguide located at a periphery of the micro-ring waveguide passes through a conductive through-hole of the second dielectric layer to connect a third electrical signal.

Referring to FIGS. 22A-2 and 22B-2 in FIG. 22, a second dielectric layer 211 is formed on the surface of the second waveguide layer 210, and a second horizontal waveguide 210A at the periphery of the micro-ring waveguide 210B pass through the conductive through-hole of the second dielectric layer 211 to connect the third electrical signal. The second dielectric layer 211 can made of silicon dioxide, or hafnium dioxide ($HFO_2$). The thickness of the second dielectric layer 211 can greater than or equal to 5 nm, or less than or equal to 15 nm, to ensure sufficient modulation bandwidth of the surface plasmon polariton micro-ring resonator 20, and take into account the modulation efficiency of the surface plasmon polariton micro-ring resonator 20. FIGS. 7 and 8 do not show the conductive through-hole.

Step 1206, forming a second surface plasmon polariton active layer on the surface of a side, away from the micro-ring waveguide, of the second dielectric layer on the micro-ring waveguide, wherein the second active layer is configured for connecting a fourth electrical signal, a contact surface of the second surface plasmon polariton active layer with the second dielectric layer is configured for generating a surface plasmon polariton for modulating the optical signal.

Referring to FIGS. 22A-3 and 22B-3 in FIG. 22, a second surface plasmon polariton active layer 212 is formed on the surface of the side, away from the micro-ring waveguide 210B, of the second dielectric layer 211 on the micro-ring waveguide 210B, the second surface plasmon polariton active layer 212 is configured to connect the fourth electrical signal, and the contact surface of the second surface plasmon polariton active layer 212 with the second dielectric layer 212 is configured to generate the surface plasmon polariton for the modulating the optical signal. The second surface plasmon polariton active layer 212 can generate surface plasmon polaritons under the action of an electrical signal, which can be epsilonnearzero. When the optical signal is in the resonant state, it can propagate at the interface between the second surface plasma active layer 212 and the second dielectric layer 211, and the propagation medium is the surface plasmon polariton, and the second surface plasmon polariton active layer 212 has a better ion dispersion effect, that is, under the action of electrical signals, the second surface plasmon polariton active layer 212 can generate carriers to change the effective refractive index at the interface between the second surface plasmon polariton active layer 212 and the second dielectric layer 211 to modulate the intensity of the optical signal.

As shown in FIG. 9, a plurality of pads 20B can be formed the surface plasmon polariton micro-ring resonator 20, each conductive through-hole is provided with a pad 20B, the conductive through-hole obtains the corresponding electrical signal through the pad 20B. The conductive through-holes passing through the second dielectric layer 211 are symmetrically about the surface plasmon polariton micro-ring resonator 20, so that their corresponding pads 20B are symmetrically about the surface plasmon polariton micro-ring resonator 20. In some embodiments, the surface plasmon polariton micro-ring resonator 20 also includes an active connection layer 20C, which is made of the same material as the second surface plasmon polariton active layer 212 and is partially located on the second surface plasmon polariton active layer 212. The second surface plasmon polariton active layer 212 is connected with the fourth electrical signal through the pad 20B on the active connection layer 20C, to avoid the second surface plasmon polariton active layer 212 on the micro-ring waveguide 210B from directly and electrically connecting with the pad 20B, and avoid damaging the second surface plasmon polariton active layer 212 and affecting the modulation efficiency of the surface plasmon polariton micro-ring resonator 20 to the optical signal.

In some embodiments, the third electrical signal can be a power supply positive signal and the fourth electrical signal can be a power supply negative signal. The difference between the third electrical signal and the fourth electrical signal is controlled to change the concentration of carriers in the second surface plasmon polariton active layer 212 to change the effective refractive index at the interface between the second surface plasmon polariton active layer 212 and the second dielectric layer 211, to modulate the intensity of the optical signal.

In order to reduce the contact resistance between the conductive through-hole and the second horizontal waveguide 210A at the periphery of the micro-ring waveguide 210B, steps are performed: forming an N-type doped area or a P-type doped area on surfaces of second horizontal waveguide 210A and the micro-ring waveguide 210B adjacent to the second dielectric layer 211.

In the embodiment, the second horizontal waveguide 210A and the micro-ring waveguide 210B are provided with N-type doped areas or P-type doped areas on the surface that is adjacent to the second dielectric layer 211 to reduce the contact resistance between the pads 20B and the second horizontal waveguide 210A at the periphery of the micro-ring waveguide 210B, to further reduce the series resistance of the surface plasmon polariton micro-ring resonator 20. In some embodiments, the value of the contact resistance between the conductive through-hole and the second horizontal waveguide 210A at the periphery of the micro-ring waveguide 210B can be controlled by controlling the concentration of dopant ions. The higher the concentration of the dopant ions, the lower the contact resistance between the pad 20B and the second horizontal waveguide 210A at the periphery of the micro-ring waveguide 210B, and the lower the concentration of the dopant ions, the lower the contact resistance between the pad 20B and the second horizontal waveguide 210A at the periphery of the micro-ring waveguide 210B. The doped concentration is generally 1019-1020 $cm^{-3}$ and the thickness of the doped layer is generally 30-70 nm, in which N-type heavily doped area or a P-type heavily doped area is formed, to further reduce the contact resistance between the pad 20B and the second horizontal waveguide 210A at the periphery of the micro-ring waveguide 210B. An N-type heavily doped area is formed on the surfaces of the second horizontal waveguide 210A and the micro-ring waveguide 210B adjacent to the second dielectric layer 211, a dopant is boron, a doped concentration is about $1\times10^{20}$ $cm^3$, a dose is about $1\times10^{15}$ $ions/cm^2$, and an energy is about 25 keV to reduce the series resistance to about 700 $\Omega/cm^2$, and the thickness of a doped layer is about 40 nm.

The micro-ring modulator and manufacturing method provided in the embodiment of the present application includes a straight waveguide and a surface plasmon polariton micro-ring resonator coupled to the straight waveguide, the straight waveguide is configured for transmitting the optical signal, and the surface plasmon polariton micro-ring resonator is configured for modulating the intensity of the optical signal with the wavelength corresponding to the surface plasmon polariton micro-ring resonator. Compared to the surface plasmon polariton component, the straight waveguide transmits the optical signal to greatly reduce the transmission loss of the optical signal. Compared to the silicon micro-ring modulator, the surface plasmon polariton micro-ring resonator can limit the optical signal to propagate at a smaller size, to reduce the size of the micro-ring resonator It will be understood by those skilled in the art that all or some of the steps, systems, and functional modules/units in the methods disclosed above may be implemented as software, firmware, hardware, and suitable combinations thereof.

In a hardware implementation, the division between functional modules/units mentioned in the above description does not necessarily correspond to a division of physical components, for example, a physical component may have multiple functions, or a function or step may be performed cooperatively by several physical components. Some or all of the physical components may be implemented as software executed by a processor, such as a central processing unit, a digital signal processor, or a microprocessor, or be implemented as hardware, or an integrated circuit, such as a specialized integrated circuit. Such software may be distributed on a computer-readable medium, which may include computer storage media (or non-transitory media) and communication media (or transitory media). As is well known to those skilled in the art, the computer storage medium includes volatile and non-volatile, removable and non-removable media implemented in any method or technology for storing information, such as computer readable instructions, data structures, program modules, or other data. The computer storage media includes, but is not limited to, RAM, ROM, EEPROM, flash memory or other memory technology, CD-ROM, digital versatile disk (DVD) or other optical disk storage, magnetic cartridges, magnetic tapes, disk storage or other magnetic storage devices, or any other media that can be used to store desired information and can be accessed by a computer. In addition, it is well known to those skilled in the art that the communication media typically contain computer readable instructions, data structures, program modules, or other data in modulated data signals such as carrier waves or other transmission mechanisms, and may include any information delivery medium.

The foregoing illustrates preferred embodiments of the present application with reference to the drawings and does not thereby limit the scope of the present application. Any modifications, equivalent substitutions and improvements made by those skilled in the art without departing from the scope and substance of the present application shall be within the scope of the present application.

What is claimed is:

1. A micro-ring modulator, comprising:
   at least one straight waveguide; and
   at least one surface plasmon polariton micro-ring resonator coupled to the straight waveguide,
   wherein the straight waveguide is configured for transmitting an optical signal, and the surface plasmon polariton micro-ring resonator is configured for modulating an intensity of an optical signal with a wavelength corresponding to the surface plasmon polariton micro-ring resonator;
   the straight waveguide comprises:
      a substrate;
      a lower cladding layer located on a surface of the substrate;
      a first waveguide layer located on a surface of a side of the lower cladding layer away from the substrate, wherein the first waveguide layer comprises a first plane waveguide and a ridge waveguide located on a surface of the first plane waveguide; and an upper cladding layer located on a surface of a side of the first waveguide layer away from the lower cladding layer, wherein the surface of the side of the upper cladding layer away from the first waveguide layer is a plane.

2. The micro-ring modulator according to claim 1, wherein the surface plasmon polariton micro-ring resonator and the straight waveguide are vertically coupled to each other, wherein the surface plasmon polariton micro-ring resonator comprises a conductive micro-ring with a groove, a first dielectric layer and a first surface plasmon polariton active layer;

the conductive micro-ring with the groove comprises a conductive inner ring, an annular groove and a conductive outer ring arranged sequentially from an inside to an outside;

a first dielectric layer is located on a surface of the conductive inner ring, on a side wall and a bottom of the annular groove and on a surface of the conductive outer ring, wherein the conductive inner ring and the conductive outer ring pass through a conductive through-hole of the first dielectric layer to connect a first electrical signal; and a first surface plasmon polariton active layer is located on a surface of a side, away from the annular groove, of the first dielectric layer inside the annular groove, wherein the first surface plasmon polariton active layer is configured for connecting a second electrical signal, a contact surface of the first surface plasmon polariton active layer with the first dielectric layer is configured for generating a surface plasmon polariton for modulating the optical signal.

3. The micro-ring modulator according to claim 1, wherein the surface plasmon polariton micro-ring resonator and the straight waveguide are horizontally coupled to each other, wherein the surface plasmon polariton micro-ring resonator comprises a second waveguide layer, a second dielectric layer and a second active layer;

the second waveguide layer comprises a second horizontal waveguide and a micro-ring waveguide located on a surface of the second horizontal waveguide, wherein the micro-ring waveguide is provided with a groove, a bottom of the groove exposes a portion of the surface of the second horizontal waveguide;

a second dielectric layer is located on the surface of the second waveguide layer, wherein the second horizontal waveguide located at a periphery of the micro-ring waveguide passes through a conductive through-hole of the second dielectric layer to connect a third electrical signal; and a second surface plasmon polariton active layer is located on the surface of a side, away from the micro-ring waveguide, of the second dielectric layer on the micro-ring waveguide, wherein the second active layer is configured for connecting a fourth electrical signal, a contact surface of the second surface plasmon polariton active layer with the second dielectric layer is configured for generating a surface plasmon polariton for modulating the optical signal.

4. The micro-ring modulator according to claim 3, wherein surfaces of the second horizontal waveguide and the micro-ring waveguide adjacent to the second dielectric layer are provided with an N-type doped area or a P-type doped area.

5. The micro-ring modulator according to claim 1, wherein a portion of the upper cladding layer covering the ridge waveguide has a thickness greater than or equal to 50 nm and less than or equal to 70 nm.

6. The micro-ring modulator according to claim 2, wherein the conductive inner ring has a diameter greater than or equal to 1.8 micrometers and less than or equal to 2.4 micrometers; and/or the conductive outer ring has a diameter greater than or equal to 2.8 micrometers and less than or equal to 3.2 micrometers; and/or the annular groove has a width greater than or equal to 80 nm and less than or equal to 100 nm.

7. The micro-ring modulator according to claim 3, wherein the micro-ring waveguide has an outer diameter greater than or equal to 10 micrometers and less than or equal to 12 micrometers; and/or the micro-ring waveguide has a width greater than or equal to 200 nm and less than or equal to 400 nm.

8. A method for manufacturing a micro-ring modulator, comprising:

manufacturing at least one straight waveguide, the straight waveguide being configured for transmitting an optical signal; and manufacturing at least one surface plasmon polariton micro-ring resonator coupled to the straight waveguide, the surface plasmon polariton micro-ring resonator being configured for modulating an intensity of an optical signal with a wavelength corresponding to the surface plasmon polariton micro-ring resonator;

wherein manufacturing a straight waveguide comprises:
providing a substrate;
forming a lower cladding layer on a surface of the substrate;
forming a first waveguide layer on a surface of a side of the lower cladding layer away from the substrate, wherein the first waveguide layer comprises a first plane waveguide and a ridge waveguide located on a surface of the first plane waveguide; and
forming an upper cladding layer on a surface of a side of the first waveguide layer away from the lower cladding layer, wherein the surface of the side of the upper cladding layer away from the first waveguide layer is a plane.

9. The method for manufacturing the micro-ring modulator according to claim 8, wherein manufacturing a surface plasmon polariton micro-ring resonator vertically coupled to the straight waveguide comprises:

forming a conductive micro-ring with a groove, wherein the conductive micro-ring with the groove comprises a conductive inner ring, an annular groove and a conductive outer ring arranged sequentially from an inside to an outside;

forming a first dielectric layer on a surface of the conductive inner ring, on a side wall and a bottom of the annular groove and on a surface of the conductive outer ring, wherein the conductive inner ring and the conductive outer ring pass through a conductive through-hole of the first dielectric layer to connect a first electrical signal; and forming a first surface plasmon polariton active layer on a surface of a side, away from the annular groove, of the first dielectric layer inside the annular groove, wherein the first surface plasmon polariton active layer is configured for connecting a second electrical signal, a contact surface of the first surface plasmon polariton active layer with the first dielectric layer is configured for generating a surface plasmon polariton for modulating the optical signal.

10. The method for manufacturing the micro-ring modulator according to claim 8, wherein manufacturing a surface plasmon polariton micro-ring resonator horizontally coupled to the straight waveguide comprises:
   forming a second waveguide layer, wherein the second waveguide layer comprises a second horizontal waveguide and a micro-ring waveguide located on a surface of the second horizontal waveguide, wherein the micro-ring waveguide is provided with a groove, a bottom of the groove exposes a portion of the surface of the second horizontal waveguide;
   forming a second dielectric layer on the surface of the second waveguide layer, wherein the second horizontal waveguide located at a periphery of the micro-ring waveguide passes through a conductive through-hole of the second dielectric layer to connect a third electrical signal; and
   forming a second surface plasmon polariton active layer on the surface of a side, away from the micro-ring waveguide, of the second dielectric layer on the micro-ring waveguide, wherein the second active layer is configured for connecting a fourth electrical signal, a contact surface of the second surface plasmon polariton active layer with the second dielectric layer is configured for generating a surface plasmon polariton for modulating the optical signal.

11. The method for manufacturing the micro-ring modulator according to claim 10, wherein before forming a second dielectric layer on the surface of the second waveguide layer further comprises:
   forming an N-type doped area or a P-type doped area on surfaces of the second horizontal waveguide and the micro-ring waveguide adjacent to the second dielectric layer.

12. The method for manufacturing the micro-ring modulator according to claim 9, wherein the conductive micro-ring is made of one or more of gold, silver or copper.

13. The method for manufacturing the micro-ring modulator according to claim 9, wherein the first surface plasmon polariton active layer comprises an epsilonnearzero.

14. The method for manufacturing the micro-ring modulator according to claim 10, wherein the second surface plasmon polariton active layer comprises an epsilonnearzero.

15. The method for manufacturing the micro-ring modulator according to claim 13, wherein the epsilonnearzero comprises a transparent conductive oxide film.

* * * * *